US006361872B1

(12) United States Patent
Hosono et al.

(10) Patent No.: US 6,361,872 B1
(45) Date of Patent: Mar. 26, 2002

(54) METAL SURFACE TREATMENT AGENTS, METHODS OF TREATING METAL SURFACES AND PRE-COATED STEEL SUBSTRATES

(75) Inventors: Tetsuo Hosono; Michiaki Nakazato, both of Yokohama; Tadayoshi Inoue, Tokyo, all of (JP)

(73) Assignee: Metal Coatings International Inc., Chardon, OH (US)

( * ) Notice: Subject to any disclaimer, the term of this patent is extended or adjusted under 35 U.S.C. 154(b) by 0 days.

(21) Appl. No.: 09/312,390

(22) Filed: May 14, 1999

(30) Foreign Application Priority Data

May 15, 1998 (JP) .............................. 10-133824

(51) Int. Cl.$^7$ .......................... C23C 22/05; B32B 15/04
(52) U.S. Cl. .................... 428/467; 427/435; 106/14.13; 106/14.43
(58) Field of Search ................. 428/626, 467, 428/469, 470; 106/14.13, 14.15, 14.21, 14.23, 14.24, 14.25, 14.35, 14.38, 14.43, 14.45

(56) References Cited

U.S. PATENT DOCUMENTS

| 3,282,848 | A | | 11/1966 | Haslam |
| 3,518,098 | A | | 6/1970 | Ford et al. |
| 3,932,562 | A | | 1/1976 | Takahashi |
| 4,025,471 | A | * | 5/1977 | Takahashi |
| 4,093,780 | A | | 6/1978 | LeRoy |
| 4,258,105 | A | | 3/1981 | Williams |
| 4,266,975 | A | | 5/1981 | Higashiyama et al. |
| 4,942,109 | A | | 7/1990 | Koizumi et al. |
| 5,026,440 | A | * | 6/1991 | Finnenthal et al. ......... 148/247 |
| 5,081,209 | A | | 1/1992 | Wu et al. |
| 5,118,536 | A | | 6/1992 | Wu et al. |
| 5,135,999 | A | | 8/1992 | Wu et al. |
| 5,173,341 | A | | 12/1992 | Shiratori et al. |
| 6,149,735 | A | * | 11/2000 | Oue et al. |
| 6,190,780 | B1 | * | 2/2001 | Shoji et al. |

FOREIGN PATENT DOCUMENTS

| EP | 0853105 | 7/1998 |
| JP | 52-111430 | 9/1977 |
| JP | 53051243 | 5/1978 |
| JP | 54107936 | 8/1979 |
| JP | 60-50228 | 10/1980 |
| JP | 59-9312 | 4/1981 |
| JP | 60258493 | 12/1985 |
| JP | 61-91369 | 5/1986 |
| JP | 4-191381 | 7/1992 |
| JP | 8-311658 | 11/1996 |
| JP | 10-46058 | 2/1998 |

OTHER PUBLICATIONS

International Search Report, Japanese Patent Office, International Application No. PCT/JP99/02511 Dated Aug. 17, 1999.
International Search Report, European Patent Office, International Application No. PCY/IB 99/00899 Dated Aug. 25, 1999 (Best Available Copy).

* cited by examiner

Primary Examiner—Deborah Jones
Assistant Examiner—Jennifer McNeil
(74) Attorney, Agent, or Firm—John J. Freer

(57) ABSTRACT

The present invention provides metal surface treatment agents and metal surface treatment methods which can form a high anticorrosion coating without use of hexavalent chromium compounds which are a cause of environmental pollution. In the present invention, a metal surface is coated with a metal surface treatment agent made of a composition containing a compound containing at least one or more mercapto groups per molecule and, depending upon need, a curing agent, curing catalyst and/or silica and the coating of the metal surface treatment agent is heat-treated.

16 Claims, No Drawings

METAL SURFACE TREATMENT AGENTS, METHODS OF TREATING METAL SURFACES AND PRE-COATED STEEL SUBSTRATES

FIELD OF THE INVENTION

The present invention relates to metal surface treatment agents and methods of treating metal surfaces by their utilization. Specifically, it relates to metal surface treatment agents which can form a cured coating to provide anticorrosion coating on metal surfaces, methods of treating metal surfaces by providing anticorrosion treatment by their utilization and pre-coated steel substrates treated with the metal surface treatment agents of the present invention. The present invention specifically relates to methods of treating metal surfaces by providing anticorrosion treatment to the surface of iron, zinc, aluminum, copper, magnesium and their alloys.

BACKGROUND OF THE INVENTION

The surface of metals such as iron, etc. easily gets rusted without any treatment, so usually various types of anticorrosion treatments are provided to the surface.

As one type of the above described anticorrosion treatments, there has been widely performed a chromate treatment in which electrical and chemical plating of a metal more base than iron is performed such as zinc plating, alloy zinc plating, aluminum plating, etc. and further the metal surface is treated using a treatment agent having a hexavalent chromium such as dichromic acid, chromic anhydride, etc. as a primary component.

Examples of the above described chromate treatments are a reactive chromate treatment such as yellow chromate treatment, coating type chromate treatment, etc.

The anticorrosive action of the chromate treatment so far is not yet completely understood, but It is assumed that chromic acid, contained in treatment agents, is reduced on metal surfaces, such as steel, to form a coating layer and this coating layer has the effect of a passivated action on the treated metal surfaces.

The above described chromate treatment excels in forming a coating excelling in anticorrosion effect on the surface of zinc plated steels and others which easily get rusty. However, recently because of environmental reasons, there has been an active movement to regulate use of hexavalent chromium compounds in metal surface treatment.

SUMMARY OF THE INVENTION

The present invention can provide metal surface treatment agents and metal surface treatment methods which have little impact on the environment because of non-use of hazardous compounds such as hexavalent chromium compounds and which can provide desirable anticorrosion effect to metal surfaces when compared with any of chromate treatment, zinc plating, and blast zinc coating treatment.

The present invention can also provide metal surface treatment agents and metal surface treatment methods, which provide anticorrosion coatings having extremely high adhesion to metal surfaces.

The present invention can provide metal surface treatment agents and metal surface treatment methods which can effectively protect the surfaces of metals such as iron, zinc, aluminum, copper, magnesium, etc., stainless steel, iron-zinc alloy, zinc-tin alloy, zinc-nickel alloy, brass, aluminum die cast, magnesium die cast, zinc die cast, and alloys of the above described metals.

Further, the present invention can provide metal surface treatment agents and metal surface treatment methods which can be favorably applied to surfaces of anticorrosion coatings formed by various methods such as electroplating, hot-dipping, plating without electrolysis, alloy plating, DACROTIZED® treatment (registered trademark), and blast zinc coating.

Corrosion resistant coating steel substrates, in which surfaces of the metal treated with various platings, such as electroplating, hot-dipping, plating without electrolysis, alloy plating, blast zinc coating treatment, etc., for example plated steel sheet, are treated with the metal surface treatment methods of the present invention, allow continuous electric resistance welding such as spot welding, seam welding. Since they excel in bending adhesion and post-bending corrosion resistance, they can be used as pre-coated steel sheets.

In one aspect, the invention is directed to a metal surface treatment agent intended to solve the above described problems which is characterized by containing, as a primary component, at least one kind of mercapto group-containing compounds selected from the following groups and further, optionally, containing at least one substituent selected from the group of curing agents, curing catalysts and silica:

(1) a mercapto group-containing compound (a) which is obtained by condensation from the esterification reaction of polyhydric alcohol having at least two or more hydroxyl groups per molecule and a mercapto group-containing acid compound having at least one or more mercapto groups per molecule and at least one or more carboxyl groups per molecule and also which has an equivalent weight of the mercapto groups in the range of 1 through 18 millimoles/g;

(2) a mercapto group-containing compound (b) which is obtained by condensation from the esterification reaction of polyhydric alcohol having at least two or more hydroxyl groups per molecule, a mercapto group-containing acid compound having at least one or more mercapto groups and at least one or more carboxyl group per molecule, and a polyacid compound having at least two or more carboxyl groups per molecule, and also which has an equivalent weight of the mercapto groups in the range of 1 through 18 millimoles/g;

(3) a mercapto group-containing compound (c) which is obtained by condensation from the esterification reaction of a hydroxyl group-containing resin having the hydroxyl value of 30 mg-KOH/g or greater and a mercapto group-containing acid compound having at least one or more mercapto groups per molecule and at least one or more carboxyl groups per molecule, and also which has an equivalent weight of the mercapto groups in the range of 1 through 18 millimoles/g; and (4) a mercapto group-containing compound (d) which contains at least one or more mercapto groups and two or more cross-linking functional groups per molecule, and also which has an equivalent weight of the mercapto groups in the range of 1 to 18 millimoles/g.

In another aspect, the invention is directed to a method of treating metal surfaces characterized by including a coating forming process, in which metal surfaces are coated with the above described metal surface treatment agent, and a heat treatment process in which the metal surface treatment agent coating is heated.

In yet another aspect, the invention is directed to a pre-coated metal substrate characterized by having a cured coating which is formed on a plated surface of the metal substrate, treated with zinc or an alloy containing zinc in its composition, using a metal surface treatment agent described above and using a method of treating metal surfaces described above.

DETAILED DESCRIPTION OF THE PREFERRED EMBODIMENT OF THE INVENTION

A method of treating metal surfaces of the present invention includes a coating forming process, in which metal surfaces are coated with the above described metal surface treatment agent, and a heat treatment process in which the metal surface treatment agent coating is heated.

Below, the above described coating formation process and heat treatment process are described in detail.

1. Coating Formation Process:

(1.1) Metal Surface Treatment Agents:

Examples of metal surface treatment agents used in the above described coating formation process are: compositions having, as a primary component, at least one kind of mercapto group-containing compounds selected from the following group; and compositions containing at least one kind of the mercapto group-containing compounds selected from the group of the mercapto group-containing compounds, (a), (b), (c) and (d) and at least one kind selected from the group of curing agents, and curing catalysts, and silica:

(1) a mercapto group-containing compound (a) which is obtained by condensation from the esterification reaction of polyhydric alcohol having at least two or more hydroxyl groups per molecule and a mercapto group-containing acid compound having at least one or more mercapto groups per molecule and at least one or more carboxyl groups per molecule, and also which has an equivalent weight of the mercapto groups in the range of 1 to 18 millimoles/g (millimoles per gram);

(2) a mercapto group-containing compound (b) which is obtained by condensation from the esterification reaction of polyhydric alcohol having at least two or more hydroxyl groups per molecule, a mercapto group-containing acid compound having at least one or more mercapto groups per molecule and at least one or more carboxyl groups per molecule, and a polyacid compound having at least two or more carboxyl groups per molecule, and also which has an equivalent weight of the mercapto groups in the range of 1 to 18 millimoles/g;

(3) a mercapto group-containing compound (c) which is obtained by condensation by the esterification reaction of a hydroxyl group-containing resin having the hydroxyl value of 30 mg-KOH/g or greater and a mercapto group-containing acid compound having at least one or more mercapto groups per molecule and at least one or more carboxyl groups per molecule, and also which has an equivalent weight of the mercapto groups in the range of 1 to 18 millimoles/g; and (4) a mercapto group-containing compound (d) which contains at least one or more mercapto groups per molecule and two or more cross-linking functional groups per molecule, and also which has an equivalent weight of the mercapto groups in the range of 1 to 18 millimoles/g.

In the specification: the above mercapto group-containing compounds (a) may be referred to as mercapto group-containing low molecular weight polyester compounds; the above mercapto group-containing compounds (b) may be referred to as mercapto group-containing high molecular weight polyester compounds; the above mercapto group-containing compounds (c) may be referred to as mercapto group-containing resins, and; the above mercapto group-containing compounds (d) may be referred to as mercapto group and cross-linking functional group-containing compounds.

(1.1.1) Mercapto Group-containing Low Molecular Weight Polyester Compounds:

This mercapto group-containing low molecular weight polyester compound is a compound obtained by condensation from the esterification reaction of polyhydric alcohol having at least two or more hydroxyl groups per molecule and a mercapto group-containing acid compound having at least one or more mercapto groups per molecule and at least one or more carboxyl group per molecule. It is preferable that the equivalent weight of the mercapto groups in the compound is 1 millimole/g or greater. When the equivalent weight of the mercapto groups in the mercapto group-containing low molecular weight polyester compound is within the above described range, not only do the mercapto groups in the molecules bond with the metal surface but also intermolecular cross-linking is formed, so a strong coating, excelling in adhesion to the metal surface, is obtained.

From an economic aspect, it is preferable that the equivalent weight of the mercapto groups in the mercapto group-containing low molecular weight polyester compound is 18 millimoles/g or less.

The equivalent weight of the mercapto groups can be measured using spectral analysis such as FT-IR (Fourier Transform infra Red spectroscopy), NMR (Nuclear Magnetic Resonance spectroscopy), etc., and chromatographic analysis such as GPC (Gel Permeation Chromatography) chromatography, etc. or, in the case where the compounding amount between polyhydric alcohol and a mercapto group-containing acid compound is clear, it may be calculated from the compounding. The equivalent weight of the mercapto groups is represented as millimole number of the mercapto groups (—SH) per 1 g of the mercapto group-containing compound. In the specification, all equivalent weights of the mercapto groups are values obtained by calculation from the compounding of the compounds.

Specific examples of the above described mercapto group-containing low molecular weight polyester compounds are compounds obtained by esterifying the hydroxyl groups of polyhydric alcohol with either the mercapto group-containing acid compounds or their derivatives (mercapto group-containing acid compound derivatives). Hereafter, these may collectively be abbreviated as mercapto group-containing acid compounds.

Examples of the above described mercapto group-containing acid compounds are, for example, mercapto group-containing carboxylic acid compounds represented by the following Formula (1).

$$HOOC-R-SH \qquad (1)$$

In Formula (1), R represents any of a linear alkyl group, a branched alkyl group and a cyclic alkyl group. It is preferable that R contains carbon atoms in the range of 1 to 20 and especially preferable is the range of 1 to 10. When the mercapto group-containing carboxylic acid compounds in which the above described R exceeds 20 carbon atoms, there are instances where the above described range of the equivalent weight of the mercapto groups in the obtained mercapto group-containing low molecular weight polyester compound becomes smaller, thus a coating having sufficient anticorrosion performance may not be obtained.

Examples of the mercapto group-containing carboxylic acid compounds are mercaptoacetic acid, 2-mercaptopropionic acid, 3-mercaptopropionic acid, 2-mercapto-2-methylpropionic acid, 3-mercapto-2-methylpropionic acid, 4-mercaptobutyric acid, 3-mercaptobutyric acid, 2-mercaptobutyric acid, 5-mercaptovaleric acid, 4-mercaptovaleric acid, 3-mercapto-valeric acid, 2-mercaptovaleric acid, 4-mercapto-3-methylbutyric acid, 3-mercapto-3-methylbutyric acid, 2-mercapto-3-methylbutyric acid, 5-mercapto-4-methylvaleric acid, 4-mercapto-4-methylvaleric acid, 3-mercapto-4-methylvaleric acid and 2-mercapto-4-methylvaleric acid.

Examples of the mercapto group-containing acid compound derivatives are acid halides of the above described mercapto group-containing carboxylic acid compounds represented by Formula (2) below:

XOC—R—SH    (2)

where, in the formula, X represents a halogen atom:

and acid anhydrides of the above described mercapto group-containing carboxylic acid compounds represented by Formula (3) below:

O=(OC—R—SH)$_2$    (3)

R in Formulas (2) and (3) is the same as R defined in Formula (1), i.e., any of a linear alkyl group, a branched alkyl group and a cyclic alkyl group and similarly, it is preferable that the carbon atoms are in the range of 1 to 20, and specially preferable is 1 to 10.

Specific examples of the mercapto group-containing acid compound derivatives represented by Formulas (2) and (3) are: acid chlorides such as mercaptoacetic acid chlorides, 2-mercaptopropionic acid chlorides, 3-mercaptopropionic acid chlorides, 2-mercapto-2-methylpropionic acid chlorides, 3-mercapto-2-methylpropionic acid chlorides, 4-mercaptobutyric acid chlorides, 3-mercaptobutyric acid chlorides, 2-mercaptobutyric acid chlorides, 5-mercaptovaleric acid chlorides, 4-mercaptovaleric acid chlorides, 3-mercaptovaleric acid chlorides, 2-mercaptovaleric acid chlorides, 4-mercapto-3-methylbutyric acid chlorides, 3-mercapto-3-methylbutyric acid chlorides, 2-mercapto-3-methylbutyric acid chlorides, 5-mercapto-4-methylvaleric acid chlorides, 4-mercapto-4-methylvaleric acid chlorides, 3-mercapto-4-methylvaleric acid chlorides, 2-mercapto-4-methylvaleric acid chlorides, etc.; and acid anhydrides such as mercaptoacetic acid anhydride, 2-mercaptopropionic acid anhydride, 3-mercaptopropionic acid an hydride, 2-mercapto-2-methylpropionic acid an hydride, 3-mercapto-2-methylpropionic acid anhydride, 4-mercaptobutyric acid an hydride, 3-mercaptobutyric acid an hydride, 2-mercaptobutyric acid an hydride, 5-mercaptovaleric acid anhydride, 4-mercaptovaleric acid anhydride, 3-mercaptovaleric acid anhydride, 2-mercaptovaleric acid anhydride, 4-mercapto-3-methylbutyric acid an hydride, 3-mercapto-3-methylbutyric acid an hydride, 2-mercapto-3-methylbutyric acid an hydride, 5-mercapto-4-methylvaleric acid an hydride, 4-mercapto-4-methylvaleric acid an hydride, 3-mercapto-4-methylvaleric acid an hydride, 2-mercapto-4-methylvaleric acid an hydride, etc.

Of these mercapto group-containing acid compounds, the mercapto group-containing carboxylic acid compounds are preferable and especially mercaptoalkylcarboxylic acid compounds containing 1 to 10 carbon atoms is preferable.

Examples of polyhydric alcohols are: dihydric alcohols such as ethylene glycol, propylene glycol, 1,3-propanediol, 1,2-butanediol, 1,3-butanediol, 1,4-butanediol; trihydric alcohols such as glycerin, trimethylolpropane; tetrahydric alcohols such as pentaerythritol, arabinose, xylulose; pentahydric alcohols such as xylose, mannose, glucose, fructose; hexahydric alcohols such as dipentaerythritol; and disaccharides such as maltose, trehalose, and sucrose.

The above described mercapto group-containing low molecular weight polyester compounds can be synthesized, for example, as follows.

As a first synthesis method, there is a method in which the mercapto group-containing acid compound and polyhydric alcohol are heated to cause an esterification reaction, depending upon need, in the presence of an esterification catalyst such as sulfuric acid, hydrochloric acid, p-toluenesulfonic acid, a chloride of zinc and tin, calcium acetate and barium acetate.

The above esterification reaction can be carried out by mixing and heating the mercapto group-containing acid compound and polyhydric alcohol. Further, the esterification reaction can be carried out in the presence of a solvent such as benzene, toluene, nitrobenzene or anisole.

As a second synthesis method, there is a method in which the mercapto group-containing acid compound derivative and polyhydric alcohol are heated to cause a reaction in the presence of a catalyst such as pyridine, etc.

Examples of the mercapto group-containing low molecular weight polyester compounds are, for example, compounds represented by the following Formula (4):

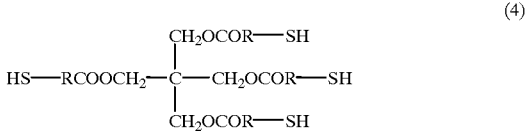

(4)

where, in the formula, R represents the same group as defined in Formula (1).

(1.1.2) Mercapto Group-containing High Molecular Weight Polyester Compounds

The mercapto group-containing high molecular weight polyester compounds are compounds obtained by condensation from the esterification reaction of polyhydric alcohol having at least two or more hydroxyl groups per molecule, a mercapto group-containing acid compound having both at least one or more mercapto groups per molecule and at least one or more carboxyl groups per molecule, and a polyacid compound having at least two or more carboxyl groups per molecule.

It is preferable that the equivalent weight of the mercapto groups in the above described compounds is 1 millimole/g or more. If the equivalent weight of the mercapto groups in the mercapto group-containing high molecular weight polyester compounds is within the range described above, not only do the mercapto groups contained in the molecules bond to the metal surface but also intermolecular cross-linking is formed, so a strong coating excelling in adhesion to the metal surface is obtained.

From an economic aspect, It is preferable that the equivalent weight of the mercapto groups in the mercapto group-containing high molecular weight polyester compounds is 18 millimoles/g or less.

Specific examples of the above mercapto group-containing high molecular weight polyester compounds are compounds obtained by esterifying a part of the hydroxyl groups of polyhydric alcohol with the mercapto group-containing acid compounds, examples of which are shown in Formula (1), Formula (2) and Formula (3) in the above described mercapto group-containing low molecular weight polyester compounds, and also by esterifying the remaining hydroxyl groups with a polyacid compound shown below.

In the mercapto group-containing acid compounds represented by Formulas (1), (2) and (3), the same as above, R represents any of a straight-chained alkyl group, a branched-chain alkyl group and a cyclic alkyl group. It is preferable that R contains carbon atoms in the range of 1 to 20 and especially preferable is the range of 1 to 10. When there is used a mercapto group-containing acid compound in which carbon atoms in R exceed 20, there are instances where the equivalent weight of the mercapto groups in the obtained mercapto group-containing high molecular weight polyester compound becomes less than the above described range, thus a coating having sufficient anticorrosion performance may not be obtained.

As specific examples of the above described mercapto group-containing acid compounds, the compounds described previously can be suitably used.

As specific examples of the polyhydric alcohols, the compounds described previously can be suitably used.

Examples of the polyacid compounds are: saturated dibasic acids such as oxalic acid, succinic acid, adipic acid, sebacic acid, 3,6-endmethylenetetrahydrophthalic acid, etc.; unsaturated dibasic acids such as maleic acid, fumaric acid, methaconic acid, citraconic acid, itaconic acid, etc.; and aromatic dibasic acids such as phthalic acid, isophthalic acid, terephthalic acid, tetrachlorophthalic acid, tetrachloroisophthalic acid, and the like.

Examples of the polyacid compound derivatives are dibasic acid anhydrides such as maleic anhydride, succinic anhydride, citraconic anhydride, itaconic anhydride, phthalic anhydride, etc.

The above described mercapto group-containing high molecular weight polyester compounds can by synthesized, for example, as follows:

As a first synthesis method, there is a method in which the mercapto group-containing acid compound, polyhydric alcohol and polyacid compound are heated to cause an esterification reaction and, depending upon need, in the presence of an esterification catalyst such as sulfuric acid, hydrochloric acid, p-toluenesulfonic acid, a chloride of zinc and tin, calcium acetate, barium acetate, etc.

The above esterification reaction can be carried out by mixing and heating the mercapto group-containing acid compound, polyhydric alcohol and polyacid compound. Further, the esterification reaction can be carried out in the presence of a solvent such as benzene, toluene, nitrobenzene, anisole, etc.

As a second synthesis method, there is a method in which the mercapto group-containing acid compound derivative, polyhydric alcohol and polyacid compound are heated to cause a reaction in the presence of a catalyst such as pyridine, etc.

Examples of the mercapto group-containing high molecular weight polyester compounds are compounds represented by the following Formula (5):

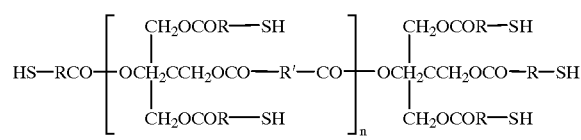

(5)

where in the formula, R represents the same group as R defined in Formula (1), R' represents an alkyl group which forms a polyester compound and n represents an integer of 1 or greater.

The number of the repeat units (n) in the mercapto group-containing high molecular weight polyester compound can be determined by the blending ratio of the mercapto group-containing acid compound and polyacid compound so that n becomes an integer of 1 or greater. However, it is preferable to prescribe blending so that the weight average molecular weight of the compound is 100,000 or less. When the molecular weight exceeds 100,000, there may be concern of occurrence of problems such as solubility into a diluting solvent and poor appearance when cured.

(1.1.3) Mercapto Group-containing Resins:

Examples of the mercapto group-containing resins are compounds obtained from condensation from the esterification reaction of a known hydroxyl group-containing resin, in which the hydroxyl value is 30 mg-KOH/g or greater as previously described, and a mercapto group-containing acid compound having at least one or more mercapto groups per molecule and at least one or more carboxyl groups per molecule.

It is preferable that the equivalent weight of the mercapto groups in the mercapto group-containing resins is 1 millimole/g or greater, the same as the above described mercapto group-containing low molecular weight polyester compounds and the mercapto group-containing high molecular weight polyester compounds. From the economic aspect, it is also preferable that the equivalent weight of the mercapto groups in the mercapto group-containing resins is 18 millimoles/g or less.

Examples of the mercapto group-containing resins are resins containing the mercapto groups obtained by esterifying at least a part of the hydroxyl groups in a known hydroxyl group-containing resin containing the hydroxyl groups in the molecules with, for example, the mercapto group containing acid compound which is described in the explanation of the mercapto group-containing low molecular weight polyester compounds.

There are no specific limits on hydroxyl group-containing resins used for the synthesis of the above described mercapto group-containing resins, but especially preferable specific examples are alkyd resins having an oil length of 50% or less, oil free alkyd resins, acryl modified alkyd resins, acrylic resins, butyral resins, etc.

The hydroxyl group-containing resins may contain other cross-linking functional groups besides the hydroxyl groups in the molecules. Specific examples of the cross-linking functional groups are a carboxyl group, ester group, vinyl group, carbamoyl group, amino group, imino group, imide group, epoxy group and isocyanate group. The mercapto groups can construct a cross-linking structure by self-crosslinking with heat or by use of a cross-linking agent. However, the introduction of these cross-linking functional groups can produce a composition which permits construction of a cross-linking structure other than that.

As an example of the mercapto group-containing resins, below, in Formula (6), an example of the mercapto group-containing resin which is synthesizable using a polyol acrylic resin having 2-hydroxyethyl methacrylate (2-HEMA) as the primary component repeat units is described.

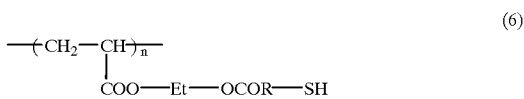

(6)

where R is the same as the R defined in Formula (1). Et and n respectively represent an ethylene group and the degree of polymerization.

As a reaction method to esterify the hydroxyl groups of the hydroxyl group-containing resins with the above described mercapto group-containing acid compound, there can be used the methods described in the mercapto group-containing low molecular weight polyester compounds.

It is preferable that the hydroxyl group-containing resins have a weight average molecular weight in the range of 1,000 to 100,000 and a hydroxyl value of 30 to 1000 mg-KOH/g. When the hydroxyl group-containing resins having a hydroxyl value of less than 30 mg-KOH/g are used, mercapto group-containing resins having the equivalent weight of the mercapto groups in the above described range may not be obtained. Resins having a hydroxyl value exceeding 1000 mg-KOH/g are practically difficult to prepare. Further, when the hydroxyl group-containing resins with a weight average molecular weight of less than 1,000 are used, a coating having superior resistance may not be formed on metal surfaces. When the hydroxyl group-containing resins with a weight average molecular weight exceeding 100,000 are used, it may be difficult to form a uniform coating on metal surfaces.

In addition, examples of the mercapto group-containing resins are compositions in which various types of thermoplastic resins and thermosetting resins used for coating materials are further compounded with the mercapto group-containing resins obtained by esterifying the hydroxyl groups of the hydroxyl group-containing resins with the mercapto group-containing acid compounds. Examples of the above described thermoplastic resins and thermosetting resins are various types of alkyd resins, acryl modified alkyd resins, acrylic resins, epoxy resins, butyral resins, polyolefin resins, fluorine resins, modified fluorine resins, etc.

(1.1.4) Mercapto Group and Cross-linking Functional Group-containing Compounds:

Such mercapto group-containing compounds are compounds having both one or more mercapto groups and two or more cross-linking functional groups per molecule. In the compounds, it is also preferable that the equivalent weight of the mercapto groups is 1 millimole/g or greater. If the equivalent weight of the mercapto groups in the mercapto group and cross-linking functional group-containing compounds is within the range described above, the mercapto groups contained in the molecules bond to the metal surfaces due to heat and intermolecular crosslinking is formed between the remaining mercapto groups and/or cross-linking functional groups, so a strong coating excelling in adhesion to the metal surface is obtained.

Furthermore, from the economic aspect, it is preferable that the equivalent weight of the mercapto groups in the mercapto group and crosslinking functional group- containing compounds is 18 millimoles/g or less.

As the mercapto group and crosslinking functional group-containing compounds, specifically triazinethiol derivatives having the structure represented below by the following Formula (7) can be favorably used:

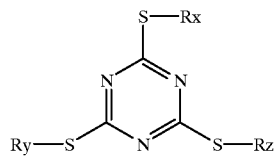

(7)

where, RX, Ry and RZ represent —H, —Na, —K, or —NR$^1$R$^2$ and R$^1$ and R$^2$ represent a hydrogen atom, or a linear or branched alkyl group having 20 carbon atoms or less.

In summary, as the above described triazinethiol derivatives, 2,4,6-trithiol-s-triazine and its alkali neutralized salts can be favorably used. Further, in the compounds, it is preferable that the carbon atoms of the alkyl groups represented by R$^1$ and R$^2$ are 20 or less. When they exceed 20, the equivalent weight of the mercapto groups in the compounds becomes less than 1 millimole/g, so there is a possibility that satisfactory coating performance may not be obtained.

In addition, as the mercapto group and crosslinking functional group-containing compounds, specifically there also can be favorably used compounds having the structure represented by the following Formula (8):

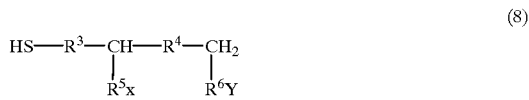

(8)

where, R$^3$ to R$^6$ represent a single bond or a linear or branched alkyl group having 20 carbon atoms or less. X and Y represent a crosslinking functional group such as a hydroxyl group, a carboxyl group, a sulfone group, a mercapto group and an amino group.

In the above described compounds, It is also preferable that the carbon atoms of groups represented by R$^1$ to R$^4$ are less than 20. When they exceed 20, the equivalent weight of the mercapto groups in the compounds may becomes less than 1 millimole/g, so there is a possibility that satisfactory coating performance may not be obtained.

As specific examples of the compounds, 1-thioglycerol and thiomaleic acid can be favorably used.

(1.1.5) Curing Agent

As the metal surface treatment agents used at the coating formation process, in addition to the above described mercapto group-containing low molecular weight polyester compounds, mercapto group-containing high molecular weight polyester compounds, mercapto group-containing resins and mercapto group and crosslinking functional group-containing compounds (these may be collectively referred to as mercapto group-containing compounds (A)), there can be included metal surface treatment agents containing curing agents (B) which react with these mercapto group-containing compounds (A) and cause them to be cured.

When the metal surface treatment agents containing the curing agent are cured, there is exhibited a technical effect of progression of finer cross-linking reaction compared to the case where no curing agent is used. This dramatically inhibits penetration of corrosive factors such as water, resulting in specially exhibiting a technical effect of improvement in corrosion resistance.

Examples of the above described curing agents (B) are at least one type of compounds selected from the groups of aminoplast compounds, polyisocyanate compounds and epoxy compounds.

Examples of the above described aminoplast compounds are: condensates of an amino compound, such as urea, melamine, benzoguanamine, and the like, and an aldehyde compound, such as formalin, acetoaldehyde, etc.; and alkyl ether compounds of the above described condensates obtained from the reaction of the above described condensates and monohydric alcohol. More specific examples are: methylolated melamines selected from dimethylolated melamine, trimethylolated melamine, tetramethylolated melamine, pentamethylolated melamine and hexamethylolated melamine; methylolated melamine alkyl ethers such as methyl ether of the above methyloy melamine, ethyl ether, propyl ether, isopropyl ether, butyl ether, isobutyl ether, etc.; urea-formamide condensates and urea- melamine condensates.

Examples of the above described polyisocyanate compounds are: organic diisocyanates such as aliphatic diisocyanates, alicyclic diisocyanates, aromatic diisocyanates, etc.; organic diisocyanate polymers in which the above described organic diisocyanates are polymerized; organic diisocyanate addition products which are addition products of the above described organic diisocyanates and compounds selected from polyal, low molecular weight polyester resins, water, etc., and; biuret compounds of the above described organic diisocyanates.

Furthermore, examples of the above described polyisocyanate compounds are block isocyanates obtained from the reaction of any of the above described organic diisocyanates, organic diisocyanate polymers, organic diisocyanate addition products and biuret compounds, and a block agent which is a compound containing active hydrogen. Examples of the compounds used as the block agents are: alcohols such as methanol, ethanol, n-propyl alcohol, isopropyl alcohol, n-butyl alcohol, isobutyl alcohol, t-butyl alcohol, ethylene glycol monomethyl ether, ethylene glycol monoethyl ether, ethylene glycol monobutyl ether, diethylene glycol monoethyl ether, propylene glycol monomethyl ether and benzyl alcohol; phenols such as phenol, cresol and xylenol; lactams such as ε-caprolactam, δ-valerolactam, γ-butyrolactam and β-propiolactam; oximes such as formamidexime, acetoaldexime, acetoxime, methyl ethyl ketoxime, diacetylmonooxime, benzophenoneoxime and cyclohexaneoxime; and active methylene compounds such as dimethyl malonate, diethyl malonate, ethyl acetoacetate, methyl acetoacetate and acetylacetone.

Examples of the above described epoxy compounds are bisphenol A epoxy resins, brominated bisphenol A epoxy resins, novolak type epoxy resins, phenol novolak type epoxy resins, alicyclic epoxy resins, polyglycidylamine type phenol resins, alcohol type epoxy resins, ester type epoxy resins and aliphatic epoxy resins.

A preferable ratio between the mercapto group-containing compound w and the curing agent (B) in the above described metal surface treatment agent is that the curing agent (B) is in the range of 1 to 300 parts in terms of solid weight in relation to 100 parts of the mercapto group-containing compound (A). It is especially preferable that the curing agent (B) be in the range of 20~200 parts, i.e., 20 to 200 parts.

In the above described metal surface treatment agent, compounding the curing agent (B) in the above described ratio causes more complete crosslinking of the mercapto group-containing compound (A) during the heat treatment process described later. Thus, a tougher coating excelling in anticorrosion effect can be formed.

(1.1.6) Additives and Catalysts

Depending upon need, pigments can be added to the above described metal surface treatment agents.

Examples of the pigments are: inorganic coloring pigments such as titanium dioxide, carbon black, iron oxide, etc.; organic coloring pigments such as phthalocyanine blue, phthalocyanine green and Quinacridone red; extender pigments such as barium sulfate, calcium carbonate and silica; and metal powders such as aluminum powder. In addition, pigments that are ordinarily used in the paint industry and ink industry can be used.

Of these, addition of silica as an additive into the metal surface treatment agents can produce technical effects of further improvement in run inhibition, further improvement in corrosion resistance and also improvement in finishing coating adhesion. Examples of silica are synthesized silica, natural silica, etc. and additionally fumed silica, colloidal silica, etc. The finer the silica particle size, the better, and considering compounding convenience and the characteristics of the cured coatings, a preferable particle size is 0.5 to 300 nm (nanometers).

The content of such silica contained in the metal surface treatment agent can be suitably determined in the range so long as the object of the present invention is not compromised, but usually in terms of the solid content, it is 0.05 to 10% by weight and especially 0.1 to 8% by weight.

A curing catalyst, which accelerates a curing reaction, can be added to the above described metal surface treatment agents. The use of the metal surface treatment agents containing a curing catalyst produces technical effects, which allow curing in a shorter time or at a lower temperature condition.

As such curing catalysts, strong acids such as p-toluenesulfonic acid, dinonylnaphthalenedisulfonic acid, dodecylbenzenesulfonic acid, phenylphosphonic acid, monobutyl maleate, butyl phosphate and hydroxyphosphates can be used as a catalyst.

For the above described metal surface treatment agents, organic and/or inorganic oxidizing agents can be favorably used as a curing catalyst.

As the inorganic oxidizing agents, lead dioxide, manganese dioxide, calcium peroxide, zinc peroxide and sodium perborate can be favorably used. As the organic oxidizing agents, favorably used are: fatty acid metal salts like driers; tertiary decanoic acids such as octyl acid, naphthenic acid and neodecanoic acid; and metal salts such as calcium, vanadium, manganese, cobalt, zinc, zirconium, lead and rare earth salts. These can be used in the above described mercapto group-containing compounds (A) without the curing agent (B) or in combination with the curing agent (B).

A content of the above described curing catalysts contained in the metal surface treatment agents is an amount which allows achievement of the object of the present invention and also can be appropriately determined depending upon the type of curing catalysts. Of the curing catalysts, organic oxidizing agents are preferable. Usually the content of the organic oxidizing agent in the metal surface treatment agent is 0.01 to 2% by weight in terms of the solid content and especially 0.01 to 1.5% by weight.

To the above described metal surface treatment agents, furthermore, there can be added additives such as ultraviolet absorbents, light stabilizers, oxidization inhibitors, fillers, suspending agents, run inhibitors, antistatic agents, surface active agents, wetting agents, dispersing agents, etc.

The above described metal surface treatment agents can be prepared as a solution, suspension solution, sol, oil-in-water type emulsion, water-in-oil type emulsion, is aqueous dispersion, non-aqueous dispersion and powder, etc.

When the metal surface treatment agents are prepared as a solution, suspension solution or sol, the following various solvents can be used.

Examples of such solvents are: ketones such as acetone, methyl ethyl ketone, 2-pentanone, 3-pentanone, 2-hexanone, methyl isobutyl ketone, 2-heptanone, 4-heptanone, diisobutyl ketone, etc.; ester type solvents such as ethyl acetate, propyl acetate, isopropyl acetate, butyl acetate, isobutyl acetate, amyl acetate, isoamyl acetate, 3-methoxybutyl acetate, 2-ethylbutyl acetate, 2-ethylhexyl acetate, cyclohexyl acetate, methyl propionate, ethyl propionate, isoamyl propionate, butyrates, isobutyrates, benzoates, ethylene glycol monoesters, ethylene glycol diesters, 2-methoxyethyl acetate, 2-ethoxyethyl acetate, 2-buthoxyethyl acetate, etc.; non-protic amide type solvents such as N,N-dimethylformamide, N,N-diethylformamide, N,N-dimethylacetoamide, N,N-diethylacetoamide, etc.; non-protic sulfoxide type solvents such as dimethyl sulfoxide, etc.; polar solvents such as non-protic amine type solvents like ternary amine, etc.; and non-polar solvents such as toluene, xylene, cyclohexanone, etc.

In the case of oil-in-water emulsion metal surface treatment agents, the above described metal surface treatment agents can be prepared, for example, by: dissolving the non-water soluble mercapto group-containing compound (A) and the curing agent (B) in a solvent which is not compatible with water or hardly compatible with water selected from the above described ketone type solvents, ester type solvents and mixed solvents; adding to this an appropriate surface active agent to disperse in water; and by further adding pigments, additives, catalysts, etc.

In the case of water-in-oil emulsion metal surface treatment agents, the above described metal surface treatment agents can be prepared, for example, such that: water-soluble mercapto group-containing compound (A) and the curing agent (B) are selected and dissolved in water; and the obtained aqueous solution is dispersed in a hydrocarbon type solvent, such as aliphatic hydrocarbon and aromatic hydrocarbon, etc., by an appropriate surface active agent. Pigments and other additives may be dissolved or suspended in advance in the above described solvent or they may be added to a dispersion solution in which the above described aqueous solution is dispersed in a hydrocarbon type solvent.

In the case of powder metal surface treatment agents, [the above described metal surface treatment agents] can be prepared, for example, by compounding the mercapto group-containing compound (A), the curing agent (B), and, depending upon need, curing catalysts and additives such as silica, etc., with a polyolefin resin, polyvinyl chloride resin or a glycidyl group-modified acrylic resin which are used for powder coating materials, and then pulverizing it.

(1.1) A method of Forming a Coating Using Metal Surface Treatment Agents (1.2.1) A method of Coating Metal Surfaces Coating of metal surfaces using the metal surface treatment agents can be performed with various methods depending upon the form of the metal surface treatment agents.

For example, when the metal surface treatment agent is in the form of a liquid such as solution, suspension solution, oil-in-water type emulsion and water-in-oil type emulsion, ordinary coating methods for coating materials sold on the market can be used such as spraying, applicator coating such as bar-coater applicator, brush coating, roll coating, electrostatic coating, dipping, dip-draining, etc. When the metal surface treatment agent is in a powder form, methods such as electrostatic coating, fluidized bed dip coating, etc. can be used.

It is preferable to coat metal surfaces with the metal surface treatment agent so that a coating thickness of 0.01 micron or greater after curing is obtained. When the coating thickness after curing is less than 0.01 micron, sufficient anticorrosion performance may not be obtained. However, from the economic aspect, it is preferable to coat metal surfaces so that the coating thickness after curing is 50 microns or less.

When the metal surface treatment agents are in liquid form, depending upon need, so long as there is no economically adverse effect, it is possible to perform the heat treatment process after setting of the agent.

2. Heat Treatment Process

At the heat treatment process, the coating of the metal surface treatment agents, obtained at the previously described coating forming process, is heat-treated.

Due to the heat treatment described above, at least a part of the mercapto groups in the mercapto group-containing compound (A), contained in the metal surface treatment agents, bonds to the metal surface. And, It is presumed that due to the self-condensation between the remaining mercapto groups, and/or the reaction between the mercapto groups and the curing agent (B), the mercapto group-containing compound (A) is cured to form a tough coating bonded firmly to the metal surface. Heat treatment at the heat treatment process can be performed, for example, in the heating furnace ambient temperature range of 100 to 450° C., but 100 to 40° C. is preferable. At the coating formation process, when the metal surface treatment agent compounded with the curing agent (B) is used, heat treatment can be performed in the heating furnace ambient temperature range of 80 to 400° C., but it is preferable to perform heat treatment in the temperature range of 80 to 380° C. The heating time in heat treatment can be, for example, 1 second to 500 minutes and 1 second to 240 minutes are preferable. The heat treatment parameters can be suitably determined by the relation between the above described treatment temperature and treatment time.

Further, when the object to be treated is a pre-coated steel sheet, It is possible to determine heat treatment parameters using the surface temperature of the object to be treated.

3. Products

There are no specific limitations on types of metals and alloys for which the method of treating metal surfaces of the present invention is applied, but especially the method of treating metal surfaces of the present invention can be preferably used on the surface of metals such as iron, zinc, aluminum, copper, magnesium, etc., stainless steel, iron-zinc alloy, zinc-tin alloy, zinc-nickel alloy, brass, aluminum die cast, magnesium die cast, zinc die cast, etc.

The method of treating metal surfaces of the present invention can be also preferably used on the above described metal surfaces treated with electroplating, hot-dipping, plating without electrolysis, alloy plating, etc. Especially preferable are plated steel sheets in which surfaces of base materials such as iron, etc. are plated with electrogalvanizing, fused zinc, fused alumina, fused zinc-aluminum alloy, zinc-nickel alloy, iron-zinc alloy, zinc-tin alloy, etc.

Further, the method of treating metal surfaces of the present invention can be preferably used for: an anticorrosion film formed by DACROTIZING® treatment (registered trademark) by coating a metal surface with a composition containing zinc powder and a water soluble chromate and then heat-treating it, as disclosed in Tokko [Publication of Examined Patent Application] No. 60-50228; an anticorrosion coating formed by coating a metal surface with a composition containing zinc powder and a specific water soluble resin and heat-treating it, as disclosed in Tokkai [Publication of Unexamined Patent Application] No. 10-46058; and a surface coating formed by performing blast zinc coating treatment (refer to Tokko No. 59-9312) in which a metal surface is blast-treated using a zinc coated blasting material in which a layer of zinc or zinc alloy is formed around the nuclei of iron or iron alloy.

The metal surface treatment agents of the present invention can be applied to various metal forms such as bolts, nuts and screws. In addition, other examples are various different shapes of metal parts, such as sheets, including H-shaped steel plates and I-shaped steel plates.

Below, the present invention is specifically described with reference to examples. The mercapto group-containing compounds A, curing agents (B) and other additives (C) used in preparation of the metal surface treatment agents used in the following examples and comparative examples are described below.

(A) Mercapto Group-containing Compounds (A):

a) SC-1:

According to the synthesis conditions and process described below, 1 mole of ethylene glycol having 2 moles of hydroxyl groups and 2 moles of 3-mercaptopropionic acid having 1 mole of carboxyl groups were esterified and condensed to synthesize a mercapto group-containing compound (SC-1). The structural formula of the compound obtained is represented by Formula (9).

HS—Et—COO—CH$_2$—CH$_2$—OCO—Et—SH     (9)

in the formula, Et represents an ethylene group.

Synthesis Conditions and Process (1) in a reaction vessel, the specified quantity of ethylene glycol and 3-mercaptopropionic acid were placed and while stirring, the raw material temperature was increased to 180° C. in about 2 hours, (2) they were reacted while maintaining the raw material temperature at 180 to 190° C. for 2 hours (progress of esterification reaction), and (3) the raw material temperature was increased to 210 to 220° C. to completely conclude the reaction and the reaction product water produced by esterification was completely removed out of the system and cooled to obtain a mercapto group-containing compound. The molecular weight and the equivalent weight of the mercapto groups of the compound obtained at this time were respectively 238 and 8.40 millimoles/g in terms of values of theoretical calculation from the blending of the raw materials.

b) SC-2:

Using trimethylolpropane and 3-mercaptopropionic acid, a compound was prepared in the same synthesis conditions and process as the synthesis of the above described mercapto group-containing compound in (a) SC-1 except that 1 mole of 3-mercaptopropionic acid having 1 mole of a carboxyl groups to 1 mole of trimethylolpropane having 3 moles of hydroxyl group were reacted. The structure of the product obtained is represented by the following Formula (10). The molecular weight and the equivalent weight of the mercapto groups of the compound obtained at this time were respectively 222 and 4.50 millimoles/g in terms of values of theoretical calculation from the compounding of the raw materials.

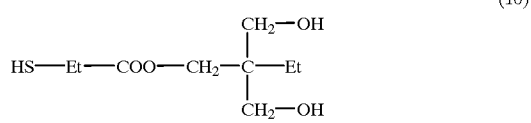

(10)

in the formula, Et having two bonding arms represents an ethylene group and Et having one bonding arm represents an ethyl group.

C) SC-3:

Using trimethylolpropane and 3-mercaptopropionic acid, a compound was prepared in the same synthesis conditions and process as the synthesis of the above described mercapto group-containing compound in (a) SC-1 except that 3 moles of 3-mercapto-propionic acid having 1 mole of a carboxyl groups to 1 mole of trimethylolpropane having 3 moles of hydroxyl groups were reacted. The structure of the product obtained is represented by the following Formula (11). The molecular weight and the equivalent weight of the mercapto groups of the compound obtained at this time were respectively 398 and 7.54 millimoles/g in terms of values of theoretical calculation from the compounding of the raw materials.

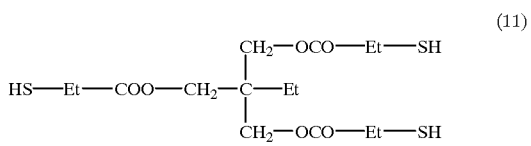

(11)

in the formula, Et having two bonding arms represents an ethylene group and Et having one bonding arm represents an ethyl group.

d) SC-4:

Using pentaerythritol and 3-mercaptopropionic acid, a compound was prepared in the same synthesis conditions and process as the synthesis of the above described mercapto group-containing compound in (a) SC-1 except that 2 moles of 3-mercaptopropionic acid having 1 mole of carboxyl groups to 1 mole of pentaerythritol having 4 moles of hydroxyl groups were reacted. The structure of the product obtained is represented by the following Formula (12). The molecular weight and the equivalent weight of the mercapto groups of the compound obtained at this time were respectively 312 and 6.41 millimoles/g in terms of values of theoretical calculation from the compounding of the raw materials.

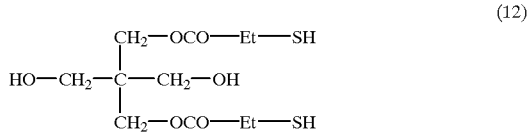

(12)

in the formula, Et represents an ethylene group.

e) SC-5:

Using pentaerythritol and 3-mercaptopropionic acid, a compound was prepared in the same synthesis conditions and process as the synthesis of the above described mercapto group-containing compound in (a) SC-1 except that 3 moles of 3-mercaptopropionic acid having 1 mole of carboxyl groups to 1 mole of pentaerythritol having 4 moles of hydroxyl groups were reacted. The structure of the product obtained is represented by the following Formula (13). The molecular weight and the equivalent weight of mercapto groups of the compound obtained at this time were respectively 400 and 7.50 millimoles/g in terms of values of theoretical calculation from the compounding of the raw materials.

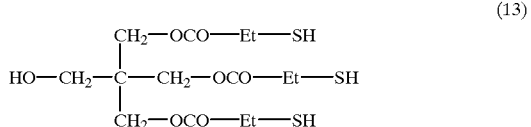

(13)

in the formula, Et represents an ethylene group.

f) SC-6:

Using pentaerythritol and mercaptoacetic acid, a compound was prepared in the same synthesis conditions and process as the synthesis of the above described mercapto group- containing compound in (a) SC-1 except that 4 moles of mercaptoacetic acid having 1 mole of carboxyl groups to 1 mole of pentaerythritol having 4 moles of hydroxyl groups were reacted. The structure of the product obtained is represented by the following Formula (14). The molecular weight and the equivalent weight of the mercapto groups of the compound obtained at this time were respectively 432 and 9.26 millimoles/g in terms of values of theoretical calculation from the compounding of the raw materials.

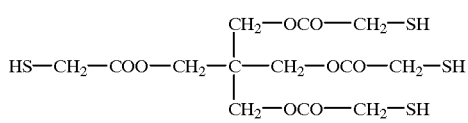
(14)

g) SC-7:

Using pentaerythritol and 3-mercaptopropionic acid, a compound was prepared in the same synthesis conditions and process as the synthesis of the above described mercapto group-containing compound in (a) SC-1 except that 4 moles of 3-mercaptopropionic acid having 1 mole of carboxyl groups to 1 mole of pentaerythritol having 4 moles of hydroxyl groups were reacted. The structure of the product obtained is represented by the following Formula (15). The molecular weight and the equivalent weight of the mercapto groups of the compound obtained at this time were respectively 488 and 8.20 millimoles/g in terms of values of theoretical calculation from the compounding of the raw material.

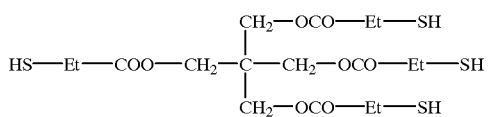
(15)

in the formula, Et represents an ethylene group.

h) SC-8:

Using pentaerythritol and 3-mercaptopropionic acid anhydride, a compound was prepared in the same synthesis conditions and process as the synthesis of the above described mercapto group-containing compound in (a) SC-1 except that 2 moles of mercaptoacetic acid containing carboxyl group anhydride (2 moles equivalent in terms of carboxyl group equivalent weight) to 1 mole of pentaerythritol having 4 moles of hydroxyl groups were reacted. The structure of the product obtained is represented by the following Formula (16). The molecular weight and the equivalent weight of the mercapto groups of the compound obtained at this time were respectively 488 and 8.20 millimoles/g in terms of values of theoretical calculation from the compounding of the raw materials.

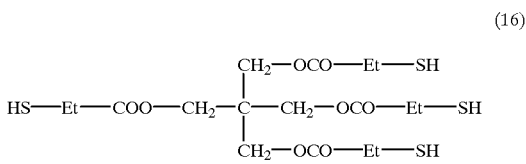
(16)

in the formula, Et represents an ethylene group.

i) SC-9:

According to the below described synthesis conditions and process, ethylene glycol having 2 moles of hydroxyl groups, 3-mercaptopropionic acid having 1 mole of carboxyl groups and terephthalic acid having 2 moles of carboxyl groups in the mole ratio of 6:2:5 were esterified and condensed to synthesize a mercapto group-containing compound (SC-9). The structural formula of the compound obtained is represented by Formula (17). The molecular weight and the equivalent weight of the mercapto groups of the compound obtained at this time were respectively 120.8 and 1.66 millimoles/g in terms of values of theoretical calculation from the compounding of the raw materials.

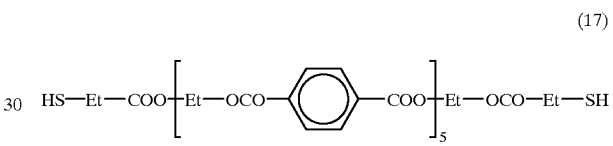
(17)

in the formula, Et represents an ethylene group.

Synthesis conditions and process (1) Same as SC-1.
(2) Same as SC-1.
(3) The raw material temperature was increased to 210 to 220° C. to completely conclude the reaction and the reaction product water produced by esterification was completely removed out of the system,
(4) the raw material was cooled sufficiently until the liquid temperature became 100° C. or less, and
(5) the specific amount of terephthalic acid was placed in the reaction vessel and after that, the esterification reaction was caused by performing the same operation as (2) described above.

j) SC-10:

A compound was prepared in the same synthesis conditions and process as the synthesis of the above described mercapto group-containing compound in (i) SC-9 except that trimethylolpropane having 3 moles of hydroxyl groups, 3-mercaptopropionic acid having 1 mole of carboxyl groups and terephthalic acid having 2 moles of carboxyl groups were reacted in the mole ratio of 51:53:50 respectively. The structure of the compound obtained is represented by Formula (18).

The molecular weight and the equivalent weight of the mercapto groups of the compound obtained at this time were respectively 18098 and 2.93 millimoles/g in terms of values of theoretical calculation from the compounding of the raw materials.

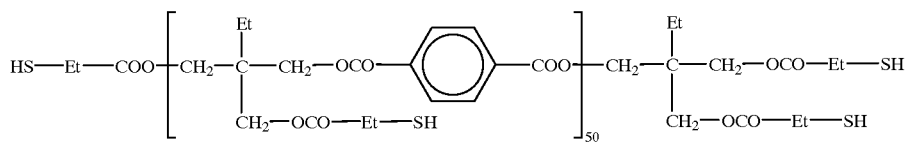

in the formula, Et having two bonding arms represents an ethylene group and Et having a single bonding arm represents an ethyl group.

k) SC-11:

A compound was prepared in the same synthesis conditions and process as the synthesis of the above described mercapto group-containing compound in (i) SC-9 except that pentaerythritol having 4 moles of hydroxyl groups, mercaptoacetic acid having 1 mole of carboxyl groups and terephthalic acid having 2 moles of carboxyl groups were reacted in the mole ratio of 51:104:50 respectively. The structure of the compound obtained is represented by Formula (19).

The molecular weight and the equivalent weight of the mercapto groups of the compound obtained at this time were respectively 21232 and 4.90 millimoles/g in terms of values of theoretical calculation from the compounding of the raw materials.

in the formula, Et represents an ethylene group.

m) SC-13:

A compound was prepared in the same synthesis conditions and process as the synthesis of the above described mercapto group-containing compound in (i) SC-9 except that pentaerythritol having 4 moles of hydroxyl groups, 3-mercaptopropionic acid having 1 mole of carboxyl groups and adipic acid having 2 moles of carboxyl groups were reacted in the mole ratio of 26:54:25 respectively. The structure of the compound obtained is represented by Formula (21).

The molecular weight and the equivalent weight of the mercapto groups of the compound obtained at this time were respectively 11038 and 4.89 millimoles/g in terms of values of theoretical calculation from the compounding of the raw materials.

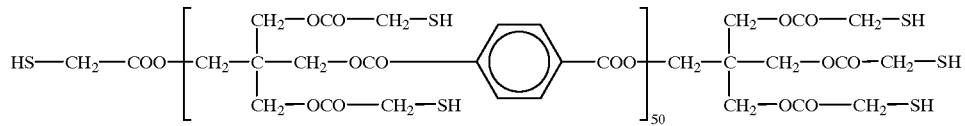

l) SC-12:

A compound was prepared in the same synthesis conditions and process as the synthesis of the above described mercapto group-containing compound in (1) SC-9 except that pentaerythritol having 4 moles of hydroxyl groups, 3-mercaptopropionic acid having 1 mole of carboxyl groups and terephthalic acid having 2 moles of carboxyl groups were reacted in the mole ratio of 51:104:50 respectively. The structure of the compound obtained is represented by Formula (20).

The molecular weight and the equivalent weight of the mercapto groups of the compound obtained at this time were respectively 22688 and 4.58 millimoles/g in terms of values of theoretical calculation from the compounding of the raw materials.

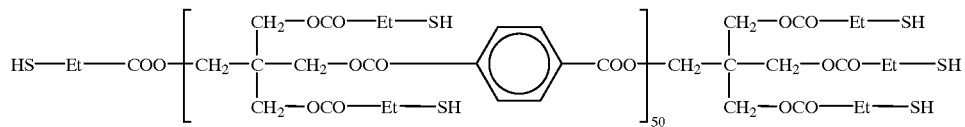

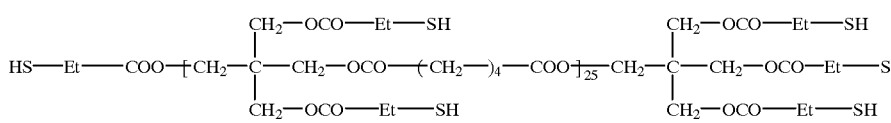

(21)

in the formula, Et represents an ethylene group.

n) SC-14:

A compound was prepared in the same synthesis conditions and process as the synthesis of the above described (i) SC-9 mercapto group-containing compound except that pentaerythritol having 4 moles of hydroxyl groups, 3-mercaptopropionic acid having 1 mole of carboxyl groups and adipic acid having 2 moles of carboxyl groups were reacted in the mole ratio of 51:104:50 respectively. The structure of the compound obtained is represented by Formula (22).

At this time, the molecular weight and the equivalent weight of the mercapto groups of the compound obtained at this time were respectively 21588 and 4.82 millimoles/g in terms of values of theoretical calculation from the compounding of the raw materials.

p) SC-16:

According to the synthesis conditions and process described below, an acrylic resin containing hydroxyl groups, [Hitalold D1002 (brand name) (weight average molecular weight: 15,000, hydroxyl value: 200 mg-KOH/g) made by hatachi chemical Co. Ltd], for coatings sold on market, and 3-mercaptopropionic acid equivalent to the hydroxyl groups contained in the acrylic resin were esterified and condensed to synthesize a mercapto group-containing compound (SC-16).

Synthesis conditions and process (1) in a reaction vessel, the specified quantity of acrylic resin containing hydroxyl groups, 3-mercaptopropionic acid and p-toluenesulfonic acid as a catalyst were placed and while stirring, the raw material temperature was increased to 140° C. in about 2 hours,

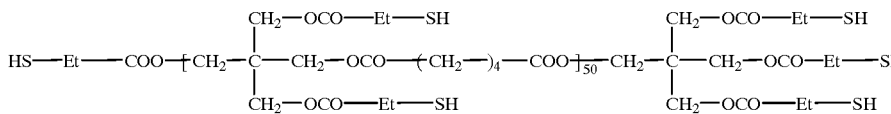

(22)

in the formula, Et represents an ethylene group.

o) SC-15:

A compound was prepared in the same synthesis conditions and process as the synthesis of the above described mercapto group-containing compound in (i) SC-9 except that pentaerythritol having 4 moles of hydroxyl groups, 3-mercaptopropionic acid having 1 mole of carboxyl groups and adipic acid having 2 moles of carboxyl groups were reacted in the mole ratio of 201:404:200 respectively. The structure of the compound obtained is represented by Formula (23).

The molecular weight and the equivalent weight of the mercapto groups of the compound obtained at this time were respectively 84888 and 4.76 millimoles/g in terms of values of theoretical calculation from the compounding of the raw materials.

(2) they were reacted while maintaining the raw material temperature at 140 to 150° C. for 2 hours (progress of esterification reaction), and (3) the raw material temperature was increased to 160 to 170° C. to completely conclude the reaction and the reaction product water produced by esterification was completely removed out of the system.

The equivalent weight of the mercapto groups of the compound obtained at this time was 2.72 millimoles/g as values of theoretical calculation from the compounding of the raw materials and the hydroxyl value.

q) SC-17

As another example of a mercapto group-containing compound, a compound represented by the following Formula (24), 2,4,6-trithiol-s-triazine, was used as a mercapto group-containing compound (c).

The molecular weight and the equivalent weight of the mercapto groups of the compound were respectively 177 and 16.9 millimoles/g as calculated values.

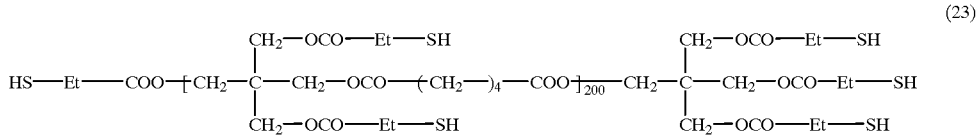

(23)

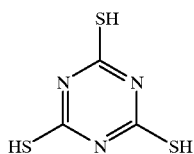

(24)

r) SC-18

A compound represented by the following Formula (25), 1-thioglycerol, was used as a mercapto group-containing compound (c).

The molecular weight and the equivalent weight of the mercapto groups of the compound were respectively 108 and 9.26 millimoles/g as calculated values.

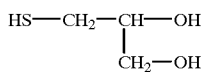

(25)

S) SC-19

A compound represented by the following Formula (26), thiomaleic acid, was used as a mercapto group-containing compound (c).

The molecular weight and the equivalent weight of the mercapto groups of the compound were respectively 150 and 6.67 millimoles/g as calculated values.

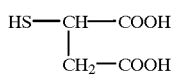

(26)

t) NC-1

As an example of a component not containing mercapto groups (A), pentaerythritol and propionic acid were esterified and condensed to prepare a compound. The synthesis conditions and process were the same as the above described SC-7.

In the esterification reaction, 4 moles of propionic acid having 1 mole of carboxyl groups to 1 mole of pentaervthritol having 4 moles of hydroxyl groups were reacted to prepare the compound. The reaction formula and the structure of the product obtained is represented by the following Formula (27).

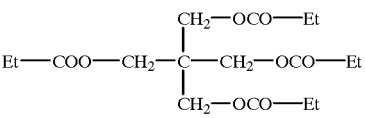

(27)

in the formula, Et represents an ethyl group.

u) NC-2

As an example of a compound which has less than 1 millimole/g of the equivalent weight of mercapto groups, a part of the 3-mercaptopropionic acid, which was a raw material used for the synthesis of the mercapto group-containing compound described in the above (m) SC-13, was replaced with propionic acid to prepare a compound. Specifically, a compound was prepared in the same synthesis conditions and process as the synthesis of the mercapto group-containing compound in the above (m) SC-13 except that pentaerythritol having 4 moles of hydroxyl groups, 3-mercaptopropionic acid having 1 mole of carboxyl groups, propionic acid having 1 mole of carboxyl groups and adipic acid having 2 moles of carboxyl groups were reacted in the mole ratio of 26:8:46:25 respectively. The structure of the compound obtained is represented by Formula (28).

The molecular weight and the equivalent weight of the mercapto groups of the compound obtained at this time were respectively 9566 and 0.84 millimoles/g as theoretical calculation values from the compounding of the raw materials.

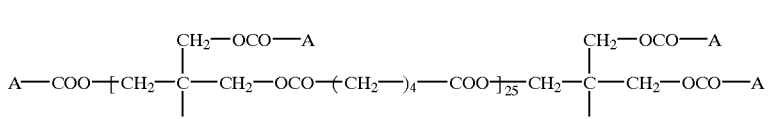

(28)

in the formula, A represents an ethyl group or a —$C_2H_4$—SH group and the ratio is 4:23 in terms of the mole ratio.

(B) curing Agents:

The following two types were used as the curing agent (component B).

a) Melamine Type Curing Agents:

Melamine resin ("Melamine 1")(Melane 2000, solids concentration: 50% by weight), made by Hitachi Chemical, or melamine resin ("Melamine 2")(Sumimal M-50W, solids concentration: 80% by weight), made by Sumitomo Chemical. Benzoguanamine resin (Mycoat 106, solids concentration: 77% by weight), made by Mitsui Cytec, Ltd,.

b) Isocyanate Type Curing Agents:

Block isocyanate (Coronate 2507, solids concentration: 80% by weight), made by Nippon Polyurethane Industries Co., Ltd,.

(C) Other Components:

As other components, the following components (component C) were used.

a) Run Inhibitor:

Fumed silica (Aerosil 200), made by Nippon Aerosil Co., Ltd,.

b) Curing Catalyst:

As a cobalt-containing curing catalyst, there was used a reagent cobalt napthenate (cobalt metal concentration: 6% by weight) made by Wako Pure Chemical Industries, Ltd,.

c) Solvents:
Methyl isobutyl ketone (MIBK), triethyleamine or demineralized water.

EXAMPLES 1 TO 56 AND COMPARATIVE EXAMPLES 1 TO 4

Examples of coating application to electrogalvanized sheet metal. The above described components (A), components (B) and components (C) were compounded as shown in Table 1 to prepare metal surface treatment agents. The unit of the compounding amount shown in Table 1 represents parts by weight. The same applies to Table 2 and the following tables. Comparative Example 4 is an example where no surface treatment was performed.

TABLE 1-1

(Formulation of metal surface treatment agents)

| | Examples | | | | | | | | | |
|---|---|---|---|---|---|---|---|---|---|---|
| | 1 | 2 | 3 | 4 | 5 | 6 | 7 | 8 | 9 | 10 |
| A | | | | | | | | | | |
| SC-1 | 100.0 | — | — | — | — | — | — | — | — | — |
| SC-2 | — | 100.0 | — | — | — | — | — | — | — | — |
| SC-3 | — | — | 100.0 | — | — | — | — | — | — | — |
| SC-4 | — | — | — | 100.0 | — | — | — | — | — | — |
| SC-5 | — | — | — | — | 100.0 | — | — | — | — | — |
| SC-6 | — | — | — | — | — | 100.0 | — | — | — | — |
| SC-7 | — | — | — | — | — | — | 100.0 | — | — | — |
| SC-8 | — | — | — | — | — | — | — | 100.0 | — | — |
| SC-9 | — | — | — | — | — | — | — | — | 100.0 | — |
| SC-10 | — | — | — | — | — | — | — | — | — | 100.0 |
| SC-11 | — | — | — | — | — | — | — | — | — | — |
| SC-12 | — | — | — | — | — | — | — | — | — | — |
| SC-13 | — | — | — | — | — | — | — | — | — | — |
| SC-14 | — | — | — | — | — | — | — | — | — | — |
| SC-15 | — | — | — | — | — | — | — | — | — | — |
| SC-16 | — | — | — | — | — | — | — | — | — | — |
| SC-17 | — | — | — | — | — | — | — | — | — | — |
| SC-18 | — | — | — | — | — | — | — | — | — | — |
| SC-19 | — | — | — | — | — | — | — | — | — | — |
| B | | | | | | | | | | |
| Melamine 1 | — | — | — | — | — | — | — | — | — | — |
| Melamine 2 | — | — | — | — | — | — | — | — | — | — |
| Benzoguanamine | — | — | — | — | — | — | — | — | — | — |
| Isocyanate | — | — | — | — | — | — | — | — | — | — |
| C | | | | | | | | | | |
| Silica | — | — | — | — | — | — | — | — | — | — |
| Cobalt | — | — | — | — | — | — | — | — | — | — |
| MIBK | 200.0 | 200.0 | 200.0 | 200.0 | 200.0 | 200.0 | 200.0 | 200.0 | 200.0 | 200.0 |
| Triethylamine | — | — | — | — | — | — | — | — | — | — |
| Demineralized Water | — | — | — | — | — | — | — | — | — | — |

TABLE 1-2

(Formulation of metal surface treatment agents)

| | Examples | | | | | | | | | |
|---|---|---|---|---|---|---|---|---|---|---|
| | 11 | 12 | 13 | 14 | 15 | 16 | 17 | 18 | 19 | 20 |
| A | | | | | | | | | | |
| SC-1 | — | — | — | — | — | — | — | — | — | 80.0 |
| SC-2 | — | — | — | — | — | — | — | — | — | — |
| SC-3 | — | — | — | — | — | — | — | — | — | — |
| SC-4 | — | — | — | — | — | — | — | — | — | — |
| SC-5 | — | — | — | — | — | — | — | — | — | — |
| SC-6 | — | — | — | — | — | — | — | — | — | — |
| SC-7 | — | — | — | — | — | — | — | — | — | — |
| SC-8 | | | | | | | | | | |
| SC-9 | — | — | — | — | — | — | — | — | — | — |
| SC-10 | — | — | — | — | — | — | — | — | — | — |
| SC-11 | 100.0 | — | — | — | — | — | — | — | — | — |
| SC-12 | — | 100.0 | — | — | — | — | — | — | — | — |
| SC-13 | — | — | 100.0 | — | — | — | — | — | — | — |
| SC-14 | — | — | — | 100.0 | — | — | — | — | — | — |

TABLE 1-2-continued (Formulation of metal surface treatment agents)

| | Examples | | | | | | | | | |
|---|---|---|---|---|---|---|---|---|---|---|
| | 11 | 12 | 13 | 14 | 15 | 16 | 17 | 18 | 19 | 20 |
| SC-15 | — | — | — | — | 100.0 | — | — | — | — | — |
| SC-16 | — | — | — | — | — | 100.0 | — | — | — | — |
| SC-17 | — | — | — | — | — | — | 100.0 | — | — | — |
| SC-18 | — | — | — | — | — | — | — | 100.0 | — | — |
| SC-19 | — | — | — | — | — | — | — | — | 100.0 | — |
| B | | | | | | | | | | |
| Melamine 1 | — | — | — | — | — | — | — | — | — | 40.0 |
| Melamine 2 | — | — | — | — | — | — | — | — | — | — |
| Benzoguanamine | — | — | — | — | — | — | — | — | — | — |
| Isocyanate | — | — | — | — | — | — | — | — | — | — |
| C | | | | | | | | | | |
| Silica | — | — | — | — | — | — | — | — | — | — |
| Cobalt | — | — | — | — | — | — | — | — | — | — |
| MIBK | 200.0 | 200.0 | 200.0 | 200.0 | 200.0 | 200.0 | — | — | — | 180.0 |
| Triethylamine | — | — | — | — | — | — | 100.0 | — | — | — |
| Demineralized Water | — | — | — | — | — | — | 100.0 | 200.0 | 200.0 | — |

TABLE 1-3

(Formulation of metal surface treatment agents)

| | Examples | | | | | | | | | |
|---|---|---|---|---|---|---|---|---|---|---|
| | 21 | 22 | 23 | 24 | 25 | 26 | 27 | 28 | 29 | 30 |
| A | | | | | | | | | | |
| SC-1 | — | — | — | — | — | — | — | — | — | — |
| SC-2 | 80.0 | — | — | — | — | — | — | — | — | — |
| SC-3 | — | 80.0 | — | — | — | — | — | — | — | — |
| SC-4 | — | — | 80.0 | — | — | — | — | — | — | — |
| SC-5 | — | — | — | 80.0 | — | — | — | — | — | — |
| SC-6 | — | — | — | — | 80.0 | — | — | — | — | — |
| SC-7 | — | — | — | — | — | 80.0 | — | — | — | — |
| SC-8 | — | — | — | — | — | — | 80.0 | — | — | — |
| SC-9 | — | — | — | — | — | — | — | 80.0 | — | — |
| SC-10 | — | — | — | — | — | — | — | — | 80.0 | — |
| SC-11 | — | — | — | — | — | — | — | — | — | 80.0 |
| SC-12 | — | — | — | — | — | — | — | — | — | — |
| SC-13 | — | — | — | — | — | — | — | — | — | — |
| SC-14 | — | — | — | — | — | — | — | — | — | — |
| SC-15 | — | — | — | — | — | — | — | — | — | — |
| SC-16 | — | — | — | — | — | — | — | — | — | — |
| SC-17 | — | — | — | — | — | — | — | — | — | — |
| SC-18 | — | — | — | — | — | — | — | — | — | — |
| SC-19 | — | — | — | — | — | — | — | — | — | — |
| B | | | | | | | | | | |
| Melamine 1 | 40.0 | 40.0 | 40.0 | 40.0 | 40.0 | 40.0 | 40.0 | 40.0 | 40.0 | 40.0 |
| Melamine 2 | — | — | — | — | — | — | — | — | — | — |
| Benzoguanamine | — | — | — | — | — | — | — | — | — | — |
| Isocyanate | — | — | — | — | — | — | — | — | — | — |
| C | | | | | | | | | | |
| Silica | | | | | | | | | | |
| Cobalt | — | — | — | — | — | — | — | — | — | — |
| MIBK | 180.0 | 180.0 | 180.0 | 180.0 | 180.0 | 180.0 | 180.0 | 180.0 | 180.0 | 180.0 |
| Triethylamine | — | — | — | — | — | — | — | — | — | — |
| Demineralized Water | — | — | — | — | — | — | — | — | — | — |

TABLE 1-4

(Formulation of metal surface treatment agents)

| | Examples | | | | | | | | | |
|---|---|---|---|---|---|---|---|---|---|---|
| | 31 | 32 | 33 | 34 | 35 | 36 | 37 | 38 | 39 | 40 |
| A | | | | | | | | | | |
| SC-1 | — | — | — | — | — | — | — | — | — | — |
| SC-2 | — | — | — | — | — | — | — | — | — | — |
| SC-3 | — | — | — | — | — | — | — | — | 80.0 | — |
| SC-4 | — | — | — | — | — | — | — | — | — | — |
| SC-5 | — | — | — | — | — | — | — | — | — | — |
| SC-6 | — | — | — | — | — | — | — | — | — | — |
| SC-7 | — | — | — | — | — | — | — | — | — | 80.0 |
| SC-9 | — | — | — | — | — | — | — | — | — | — |
| SC-10 | — | — | — | — | — | — | — | — | — | — |
| SC-11 | — | — | — | — | — | — | — | — | — | — |
| SC-12 | 80.0 | — | — | — | — | — | — | — | — | — |
| SC-13 | — | 80.0 | — | — | — | — | — | — | — | — |
| SC-14 | — | — | 80.0 | — | — | — | — | — | — | — |
| SC-15 | — | — | — | 80.0 | — | — | — | — | — | — |
| SC-16 | — | — | — | — | 80.0 | — | — | — | — | — |
| SC-17 | — | — | — | — | — | 80.0 | — | — | — | — |
| SC-18 | — | — | — | — | — | — | 80.0 | — | — | — |
| SC-19 | — | — | — | — | — | — | — | 80.0 | — | — |
| B | | | | | | | | | | |
| Melamine 1 | 40.0 | 40.0 | 40.0 | 40.0 | 40.0 | — | — | — | — | — |
| Melamine 2 | — | — | — | — | — | 25.0 | 25.0 | 25.0 | — | — |
| Benzoguanamine | — | — | — | — | — | — | — | — | 26.0 | 26.0 |
| Isocyanate | — | — | — | — | — | — | — | — | — | — |
| C | | | | | | | | | | |
| Silica | — | — | — | — | — | — | — | — | — | — |
| Cobalt | — | — | — | — | — | — | — | — | — | — |
| MIBK | 180.0 | 180.0 | 180.0 | 180.0 | 180.0 | — | — | — | 194.0 | 194.0 |
| Triethylamine | — | — | — | — | — | 80.0 | — | — | — | — |
| Demineralized Water | — | — | — | — | — | 115.0 | 195.0 | 195.0 | — | — |

TABLE 1-5

(Formulation of metal surface treatment agents)

| | Examples | | | | | | | | | |
|---|---|---|---|---|---|---|---|---|---|---|
| | 41 | 42 | 43 | 44 | 45 | 46 | 47 | 48 | 49 | 50 |
| A | | | | | | | | | | |
| SC-1 | — | — | — | — | — | — | — | — | — | — |
| SC-2 | — | — | — | — | — | — | — | — | — | — |
| SC-3 | — | 80.0 | — | — | 80.0 | — | — | — | — | — |
| SC-4 | — | — | — | — | — | — | — | — | — | — |
| SC-5 | — | — | — | — | — | — | — | — | — | — |
| SC-6 | — | — | — | — | — | — | — | — | — | — |
| SC-7 | — | — | 80.0 | — | — | 80.0 | — | — | — | — |
| SC-8 | — | — | — | — | — | — | — | — | — | — |
| SC-9 | — | — | — | — | — | — | — | — | — | — |
| SC-10 | — | — | — | — | — | — | — | — | — | — |
| SC-11 | — | — | — | — | — | — | — | — | — | — |
| SC-12 | 80.0 | — | — | 80.0 | — | — | 80.0 | — | — | — |
| SC-13 | — | — | — | — | — | — | — | — | — | — |
| SC-14 | — | — | — | — | — | — | — | — | — | — |
| SC-15 | — | — | — | — | — | — | — | — | — | — |
| SC-16 | — | — | — | — | — | — | — | — | — | — |
| SC-17 | — | — | — | — | — | — | — | 80.0 | — | — |
| SC-18 | — | — | — | — | — | — | — | — | 80.0 | — |
| SC-19 | — | — | — | — | — | — | — | — | — | 80.0 |
| B | | | | | | | | | | |
| Melamine 1 | — | — | — | — | 40.0 | 40.0 | 40.0 | — | — | — |
| Melamine 2 | — | — | — | — | — | — | — | 25.0 | 25.0 | 25.0 |
| Benzoguanamine | 26.0 | — | — | — | — | — | — | — | — | — |
| Isocyanate | — | 25.0 | 25.0 | 25.0 | — | — | — | — | — | — |

TABLE 1-5-continued (Formulation of metal surface treatment agents)

| | Examples | | | | | | | | | |
|---|---|---|---|---|---|---|---|---|---|---|
| | 41 | 42 | 43 | 44 | 45 | 46 | 47 | 48 | 49 | 50 |
| C | | | | | | | | | | |
| Silica | — | — | — | — | 2.0 | 2.0 | 2.0 | 2.0 | 2.0 | 2.0 |
| Cobalt | — | — | — | — | — | — | — | — | — | — |
| MIBK | 194.0 | 195.0 | 195.0 | 195.0 | 178.0 | 178.0 | 178.0 | — | — | — |
| Triethylamine | — | — | — | — | — | — | — | 80.0 | — | — |
| Demineralized Water | — | — | — | — | — | — | — | 113.0 | 193.0 | 193.0 |

TABLE 1-6

(Formulation of metal surface treatment agents)

| | Examples | | | | | |
|---|---|---|---|---|---|---|
| | 51 | 52 | 53 | 54 | 55 | 56 |
| A | | | | | | |
| SC-1 | — | — | — | — | — | — |
| SC-2 | — | — | — | — | — | — |
| SC-3 | 80.0 | — | — | 80.0 | — | — |
| SC-4 | — | — | — | — | — | — |
| SC-5 | — | — | — | — | — | — |
| SC-6 | — | — | — | — | — | — |
| SC-7 | — | 80.0 | — | — | 80.0 | — |
| SC-8 | — | — | — | — | — | — |
| SC-9 | — | — | — | — | — | — |
| SC-10 | — | — | — | — | — | — |
| SC-11 | — | — | — | — | — | — |
| SC-12 | — | — | 80.0 | — | — | 80.0 |
| SC-13 | — | — | — | — | — | — |
| SC-14 | — | — | — | — | — | — |
| SC-15 | — | — | — | — | — | — |
| SC-16 | — | — | — | — | — | — |
| SC-17 | — | — | — | — | — | — |
| SC-18 | — | — | — | — | — | — |
| SC-19 | — | — | — | — | — | — |
| B | | | | | | |
| Melamine 1 | 40.0 | 40.0 | 40.0 | 40.0 | 40.0 | 40.0 |
| Melamine 2 | — | — | — | — | — | — |
| Benzoguanamine | — | — | — | — | — | — |
| Isocyanate | — | — | — | — | — | — |
| C | | | | | | |
| Silica | — | — | — | 2.0 | 2.0 | 2.0 |
| Cobalt | 0.1 | 0.1 | 0.1 | 0.1 | 0.1 | 0.1 |
| MIBK | 179.9 | 179.9 | 179.9 | 177.9 | 177.9 | 177.9 |
| Triethylamine | — | — | — | — | — | — |
| Demineralized Water | — | — | — | — | — | — |

TABLE 1-7

(Formulation of metal surface treatment agents)

| | | Comparison Examples | | |
|---|---|---|---|---|
| | | 1 | 2 | 3 |
| A | NC-1 | 100.0 | 80.0 | — |
| | NC-2 | — | — | 80.0 |
| B | Melamine 1 | — | 40.0 | 40.0 |

TABLE 1-7-continued (Formulation of metal surface treatment agents)

| | | Comparison Examples | | |
|---|---|---|---|---|
| | | 1 | 2 | 3 |
| C | Silica | — | 2.0 | — |
| | Cobalt | — | 0.1 | — |
| | MIBK | 200.0 | 177.9 | 180.0 |

In the above Table 1, "Melamine 1", "Melamine 2", "Benzoguanamine" and "(2) 0Isocyanate" in the component (B) column represent melamine type curing agents (above s described brand names of "Melane 2000", "Sumimal M-50W" and "Mycoat 106") and the isocyanate type coronate 2507 curing agent. Further, "cobalt" represents the above described cobalt napthanate. This also applies to Tables 2 through 9.

The metal surface treatment agents in Table 1 were applied on electrogalvanized steel sheets (sheet thickness: 0.8 mm, zinc deposit: 50 g/m$^2$) using a bar coater. After setting for 10 minutes, they were cured at 200° C. for 30 minutes. The coating thickness after curing was 2 to 3 microns.

Comparative Example 4 was not provided with surface treatment.

EXAMPLES 57 TO 60 AND COMPARATIVE EXAMPLES 5 AND 6

Coating application on hot-dipped zinc plated steel sheets.

The above described component (A), component (B) and component (C) were compounded as shown in Table 2 to prepare metal surface treatment agents.

The metal surface treatment agents in Table 2 were applied on hot-dipped zinc plated steel sheets with a thickness of 0.35 mm (zinc deposit: 50 g/m$^2$) using a bar coater. After setting for 10 minutes, they were cured at 200° C. for 30 minutes. The coating thickness after curing was 2 to 3 microns.

Comparative Example 6 was not provided with surface treatment.

EXAMPLE 61 TO 64 AND COMPARATIVE EXAMPLES 7 AND 8

Coating application on hot-dipped zinc-aluminum alloy plated steel sheets.

The above described component A), component (B) and component (C) were compounded as shown in the following Table 3 to prepare metal surface treatment agents.

The metal surface treatment agents in Table 3 were applied, using a bar coater, on hot-dipped zinc-aluminum alloy plated steel sheets having a sheet thickness of 0.35 mm (alloy deposit: 50 g/m$^2$). After setting for 10 minutes, they were cured at 200° C. for 30 minutes. The coating thickness after curing was 2 to 3 microns.

Comparative Example 8 was not provided with surface treatment.

EXAMPLE 65 TO 68 AND COMPARATIVE EXAMPLES 9 AND 10

Coating application on aluminum alloy steel sheet.

The above described component (A), component (B) and component (C) were compounded as shown in the following Table 4 to prepare metal surface treatment agents.

The metal surface treatment agents in Table 4 were applied on aluminum sheet (A5025 synthesized aluminum sheet (aluminum content: 90%)), specified in JIS-H-4000, using a bar coater. After setting for 10 minutes, they were cured at 200° C. for 30 minutes. The coating thickness after curing was 2 to 3 microns.

Comparative Example 10 was not provided with surface treatment.

EXAMPLES 69 TO 72 AND COMPARATIVE EXAMPLES 11 AND 12

Coating application on SPCC-SD iron plates (cold rolled steel—unpolished iron plates).

The above described component (A), component (B) and component (C) were compounded as shown in Table 5 to prepare metal surface treatment agents.

Comparative Example 12 was not provided with surface treatment.

The metal surface treatment agents in Table 5 were applied on SPCC-SD iron plates (no treatment) using a bar coater. After setting for 10 minutes, they were cured at 200° C. for 30 minutes. The coating thickness after curing was 2 to 3 microns.

TABLE 2

(Formulation of metal surface treatment agents)

| | Examples | | | | Comparative Example |
|---|---|---|---|---|---|
| | 57 | 58 | 59 | 60 | 5 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |
| C | | | | | |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

TABLE 3

(Formulation of metal surface treatment agents)

| | Examples | | | | Comparative Example |
|---|---|---|---|---|---|
| | 61 | 62 | 63 | 64 | 7 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |
| C | | | | | |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

TABLE 4

(Formulation of metal surface treatment agents)

| | Examples | | | | Comparative Example |
|---|---|---|---|---|---|
| | 65 | 66 | 67 | 68 | 9 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |
| C | | | | | |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

TABLE 5

(Formulation of metal surface treatment agents)

| | Examples | | | | Comparative Example |
|---|---|---|---|---|---|
| | 69 | 70 | 71 | 72 | 11 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |

TABLE 5-continued (Formulation of metal surface treatment agents)

| | Examples | | | | Comparative Example |
|---|---|---|---|---|---|
| | 69 | 70 | 71 | 72 | 11 |
| C | | | | | |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

EXAMPLES 73 to 76 AND COMPARATIVE EXAMPLES 13 AND 14

Coating application on magnesium alloy plates.

The above described component (A), component (B) and component (C) were compounded as shown in Table 6 to prepare metal surface treatment agents.

The metal surface treatment agents in Table 6 were applied on AZ-91D magnesium alloy (90% magnesium, 9% aluminum, 1% zinc) plates using a bar coater. After setting for 10 minutes, they were cured at 200° C. for 30 minutes. The coating thickness after curing was 2 to 3 microns.

Comparative Example 14 was not provided with surface treatment.

EXAMPLES 77 TO 80 AND COMPARATIVE EXAMPLES 15 AND 16

Coating application on DACROTIZED® treated iron bolts.

The above described component A, component (B) and component (C) were compounded as shown in Table 7 to prepare metal surface treatment agents.

In a bath filled with the metal surface treatment agents in Table 7, DACROTIZED® treated hexa (hex head) iron bolts were coated by dip-draining. After setting for 10 minutes, they were cured at 200° C. for 30 minutes. The coating thickness after curing was 2 to 3 microns.

Comparative Example 16 was not provided with surface treatment.

EXAMPLES 81 to 84 AND COMPARATIVE EXAMPLES 17 AND 18

Coating application on blast zinc coated iron bolts (iron bolts blast coated with zinc coated steel shot).

The above described component (A), component (B) and component (C) were compounded as shown in Table 8 to prepare metal surface treatment agents.

Comparative Example 18 was not provided with surface treatment.

Blast zinc coating treated hexa iron bolts were dipped for coating in a bath filled with the metal surface treatment agents shown in Table 6, removed from the bath and excess coating was permitted to drain from the bolts (dip-draining). After setting for 10 minutes, they were cured at 200° C. for 30 minutes. The coating thickness after curing was 2 to 3 microns.

TABLE 6

(Formulation of metal surface treatment agents)

| | Examples | | | | Comparative Example |
|---|---|---|---|---|---|
| | 73 | 74 | 75 | 76 | 13 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |
| C | | | | | |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

TABLE 7

(Formulation of metal surface treatment agents)

| | Examples | | | | Comparative Example |
|---|---|---|---|---|---|
| | 77 | 78 | 79 | 80 | 15 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |
| C | | | | | |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

TABLE 8

(Formulation of metal surface treatment agents)

| | Examples | | | | Comparative Example |
|---|---|---|---|---|---|
| | 81 | 82 | 83 | 84 | 17 |
| A | | | | | |
| SC-3 | 80.0 | — | — | — | — |
| SC-7 | — | 80.0 | — | — | — |
| SC-12 | — | — | 80.0 | — | — |
| SC-18 | — | — | — | 80.0 | — |
| NC-1 | — | — | — | — | 80.0 |
| B | | | | | |
| Melamine 1 | 40.0 | 40.0 | 40.0 | — | 40.0 |
| Melamine 2 | — | — | — | 25.0 | — |

TABLE 8-continued (Formulation of metal surface treatment agents)

|  | Examples | | | | Comparative Example |
|---|---|---|---|---|---|
|  | 81 | 82 | 83 | 84 | 17 |
| C |  |  |  |  |  |
| Silica | 2.0 | 2.0 | 2.0 | 2.0 | 2.0 |
| Cobalt | 0.1 | 0.1 | 0.1 | — | 0.1 |
| MIBK | 177.9 | 177.9 | 177.9 | — | 177.9 |
| Demineralized Water | — | — | — | 193.0 | — |

Corrosion Resistance Test:

a) Preparation for Corrosion Resistance Test:

Using a cutter, X-shaped cutting marks were cut through the surfaces and into the metal of the electrogalvanized steel sheets of Examples 1 to 56 and Comparative Examples 1 to 4, hot-dipped zinc plated steel sheets of Examples 57 to 60 and Comparative Examples 5 and 6, hot-dipped zinc-aluminum alloy plated steel sheets of Examples 61 to 64 and Comparative Examples 7 and 8, aluminum alloy plates of Examples 65 to 68 and Comparative Examples 9 and 10, SPCC-SD iron plates of Examples 69 to 72 and Comparative Examples 13 and 12, and magnesium alloy plates of Examples 73 to 76 and Comparative Examples 13 and 14. Each of the passivated films formed on the surfaces of the base metals treated as described in the Examples and Comparative Examples was evaluated for corrosion resistance.

In addition, tests were conducted on the DACROTIZED® treated iron bolts and iron bolts treated with blast zinc coating but allowed to remain intact without scratching with a cutter.

b) Corrosion Test Method:

Salt spray tests were conducted in accordance with JIS-Z-2371. Testing hours were determined based upon the type of base metal sheets and plates.

c) Evaluation Method:

Rust occurrence was visually evaluated for the metal sheets/plates and hexa bolts, which underwent the spray test according to the above described (b). Specifically, the evaluation was performed using a percentage of the areas in which white rust or red rust occurred in relation to the entire areas of the metal sheets/plates and hexa bolts. Results are shown in Table 9 below.

TABLE 9

| Example | Component A | Component B | Component C Silica | Component C Curing Catalyst | Salt Spray Test Hours | Salt Spray Test Area of White Rust (%) | Salt Spray Test Area of Red Rust (%) |
|---|---|---|---|---|---|---|---|
| 1 | Electro-galvanized steel sheet | SC-1 | No | No | 500 hours | 100 (entire area) | 15 |
| 2 |  | SC-2 | No | No |  | 100 (entire area) | 10 |
| 3 |  | SC-3 | No | No |  | 100 (entire area) | 5 |
| 4 |  | SC-4 | No | No |  | 100 (entire area) | 10 |
| 5 |  | SC-5 | No | No |  | 100 (entire area) | 5 |
| 6 |  | SC-6 | No | No |  | 90 | 1 |
| 7 |  | SC-7 | No | No |  | 95 | 1 |
| 8 |  | SC-8 | No | No |  | 95 | 1 |
| 9 |  | SC-9 | No | No |  | 100 | 3 |
| 10 |  | SC-10 | No | No |  | 90 | 1 |
| 11 |  | SC-11 | No | No |  | 85 | 1 |
| 12 |  | SC-12 | No | No |  | 85 | 1 |
| 13 |  | SC-13 | No | No |  | 90 | 1 |
| 14 |  | SC-14 | No | No |  | 85 | 1 |
| 15 |  | SC-15 | No | No |  | 80 | 1 |
| 16 |  | SC-16 | No | No |  | 90 | 3 |
| 17 |  | SC-17 | No | No |  | 100 (entire area) | 15 |
| 18 |  | SC-18 | No | No |  | 95 | 20 |
| 19 |  | SC-19 | No | No |  | 90 | 20 |
| 20 |  | SC-1 | Melamine 1 | No | No | 95 | No occurrence |
| 21 |  | SC-2 | Melamine 1 | No | No | 80 | No occurrence |
| 22 |  | SC-3 | Melamine 1 | No | No | 70 | No occurrence |
| 23 |  | SC-4 | Melamine 1 | No | No | 70 | No occurrence |
| 24 |  | SC-5 | Melamine 1 | No | No | 65 | No occurrence |
| 25 |  | SC-6 | Melamine 1 | No | No | 60 | No occurrence |
| 26 |  | SC-7 | Melamine 1 | No | No | 60 | No occurrence |
| 27 |  | SC-8 | Melamine 1 | No | No | 65 | No occurrence |
| 28 |  | SC-9 | Melamine 1 | No | No | 70 | No occurrence |
| 29 |  | SC-10 | Melamine 1 | No | No | 65 | No occurrence |
| 30 |  | SC-11 | Melamine 1 | No | No | 60 | No occurrence |
| 31 |  | SC-12 | Melamine 1 | No | No | 60 | No occurrence |

TABLE 9-continued

| | | | Component C | | Salt Spray Test | | |
| | | | | | | Test Results | |
| | Component A | Component B | Silica | Curing Catalyst | Hours | Area of White Rust (%) | Area of Red Rust (%) |
|---|---|---|---|---|---|---|---|
| 32 | | SC-13 | Melamine 1 | No | No | | 65 | No occurrence |
| 33 | | SC-14 | Melamine 1 | No | No | | 60 | No occurrence |
| 34 | | SC-15 | Melamine 1 | No | No | | 55 | No occurrence |
| 35 | | SC-16 | Melamine 1 | No | No | | 60 | No occurrence |
| 36 | | SC-17 | Melamine 2 | No | No | | 80 | No occurrence |
| 37 | | SC-18 | Melamine 2 | No | No | | 70 | No occurrence |
| 38 | | SC-19 | Melamine 2 | No | No | | 70 | No occurrence |
| 39 | | SC-3 | Benzo-guanamine | No | No | | 50 | No occurrence |
| 40 | | SC-7 | Benzo-guanamine | No | No | | 50 | No occurrence |
| 41 | | SC-12 | Benzo-guanamine | No | No | | 50 | No occurrence |
| 42 | | SC-3 | Isocyanate | No | No | | 40 | No occurrence |
| 43 | | SC-7 | Isocyanate | No | No | | 40 | No occurrence |
| 44 | | SC-12 | Isocyanate | No | No | | 35 | No occurrence |
| 45 | | SC-3 | Melamine 1 | Yes | No | | 10 | No occurrence |
| 46 | | SC-7 | Melamine 1 | Yes | No | | 5 | No occurrence |
| 47 | | SC-12 | Melamine 1 | Yes | No | | 10 | No occurrence |
| 48 | | SC-17 | Melamine 2 | Yes | No | | 15 | No occurrence |
| 49 | | SC-18 | Melamine 2 | Yes | No | | 15 | No occurrence |
| 50 | | SC-19 | Melamine 2 | Yes | No | | 15 | No occurrence |
| 51 | | SC-3 | Melamine 1 | No | Cobalt | | 15 | No occurrence |
| 52 | | SC-7 | Melamine 1 | No | Cobalt | | 10 | No occurrence |
| 53 | | SC-12 | Melamine 1 | No | Cobalt | | 15 | No occurrence |
| 54 | | SC-3 | Melamine 1 | Yes | Cobalt | | No occurrence | No occurrence |
| 55 | | SC-7 | Melamine 1 | Yes | Cobalt | | No occurrence | No occurrence |
| 56 | | SC-12 | Melamine 1 | Yes | Cobalt | | No occurrence | No occurrence |
| Comparative Example | | | | | | | | |
| 1 | | NC-1 | No | No | No | | Too much red rust. Impossible to evaluate. | 100 (entire area) |
| 2 | | NC-1 | Melamine 1 | Yes | Cobalt | | Too much red rust. Impossible to evaluate | 85 |
| 3 | | NC-2 | Melamine 1 | No | No | | Too much red rust. Impossible to evaluate. | 90 |
| 4 | | | No surface treatment | | | | Too much red rust. Impossible to evaluate. | 100 (entire area) |
| Example | | | | | | | | |
| 57 | Hot-dipped zinc plated steel sheet | SC-3 | Melamine 1 | Yes | Cobalt | 500 hours | 50 | No occurrence |
| 58 | | SC-7 | Melamine 1 | Yes | Cobalt | | 40 | No occurrence |
| 59 | | SC-12 | Melamine 1 | Yes | Cobalt | | 40 | No occurrence |
| 60 | | SC-18 | Melamine 2 | Yes | No | | 55 | No occurrence |
| Comparative Example | | | | | | | | |
| 5 | | NC-1 | Melamine 1 | Yes | Cobalt | | 100 (entire area) | 50 |
| 6 | | | No surface treatment | | | | 100 (entire area) | 90 |
| Example | | | | | | | | |
| 61 | Hot-dipped zinc-aluminum | SC-3 | Melamine 1 | Yes | Cobalt | 500 hours | No occurrence | No occurrence |

TABLE 9-continued

| | | | | Component C | | Salt Spray Test | | |
| --- | --- | --- | --- | --- | --- | --- | --- | --- |
| | | | | | | | Test Results | |
| | | Component A | Component B | Silica | Curing Catalyst | Hours | Area of White Rust (%) | Area of Red Rust (%) |
| | alloy plated steel sheet | | | | | | | |
| 62 | | | SC-7 | Melamine 1 | Yes | Cobalt | No occurrence | No occurrence |
| 63 | | | SC-12 | Melamine 1 | Yes | Cobalt | No occurrence | No occurrence |
| 64 | | | SC-18 | Melamine 2 | Yes | No | No occurrence | No occurrence |
| Comparative Example | | | | | | | | |
| 7 | | | NC-1 | Melamine 1 | Yes | Cobalt | 20 | 20 (black rust) |
| 8 | | | No surface treatment | | | | 50 | 30 (black rust) |
| Example | | | | | | | | |
| 65 | Aluminum alloy sheet | SC-3 | Melamine 1 | Yes | Cobalt | 600 hours | 10 (slightly) | — |
| 66 | | SC-7 | Melamine 1 | Yes | Cobalt | | 5 (slightly) | — |
| 67 | | SC-12 | Melamine 1 | Yes | Cobalt | | 5 (slightly) | — |
| 68 | | SC-18 | Melamine 2 | Yes | No | | 10 (slightly) | — |
| Comparative Example | | | | | | | | |
| 9 | | NC-1 | Melamine 1 | Yes | Cobalt | | 50 | — |
| 10 | | No surface treatment | | | | | 60 | — |
| Example | | | | | | | | |
| 69 | SPCC-SD iron plates | SC-3 | Melamine 1 | Yes | Cobalt | 60 hours | No occurrence | 10 |
| 70 | | SC-7 | Melamine 1 | Yes | Cobalt | | No occurrence | 5 |
| 71 | | SC-12 | Melamine 1 | Yes | No | | No occurrence | 5 |
| 72 | | SC-18 | Melamine 2 | Yes | No | | No occurrence | 15 |
| Comparative Example | | | | | | | | |
| 11 | | NC-1 | Melamine | Yes | Cobalt | | No occurrence | 80 |
| 12 | | No surface treatment | | | | | No occurrence | 90 |
| Example | | | | | | | | |
| 73 | Magnesium alloy plates | SC-3 | Melamine 1 | Yes | Cobalt | 100 hours | 20 | — |
| 74 | | SC-4 | Melamine 1 | Yes | Cobalt | | 15 | — |
| 75 | | SC-12 | Melamine 1 | Yes | Cobalt | | 15 | — |
| 76 | | SC-18 | Melamine 2 | Yes | No | | 25 | — |
| Comparative Example | | | | | | | | |
| 13 | | NC-1 | Melamine 1 | Yes | Cobalt | | 80 | — |
| 14 | | No surface treatment | | | | | 95 | — |
| Example | | | | | | | | |
| 77 | DACROTIZED ® treated iron bolts | SC-3 | Melamine 1 | Yes | Cobalt | 1,000 hours | 5 (slightly) | No occurrence |
| 78 | | SC-7 | Melamine 1 | Yes | Cobalt | | No occurrence | No occurrence |
| 79 | | SC-12 | Melamine 1 | Yes | Cobalt | | No occurrence | No occurrence |

TABLE 9-continued

| | Component A | Component B | Component C Silica | Curing Catalyst | Hours | Salt Spray Test Test Results Area of White Rust (%) | Area of Red Rust (%) |
|---|---|---|---|---|---|---|---|
| 80 Comparative Example | | SC-18 | Melamine 2 Yes | No | | 10 (slightly) | No occurrence |
| 15 | | NC-1 | Melamine 1 Yes | Cobalt | | 100 | No occurrence |
| 16 Example | | | No surface treatment | | | 100 | No occurrence |
| 81 | Blast zinc coat-treated iron bolts | SC-3 | Melamine 1 Yes | Cobalt | 200 hours | No occurrence | No occurrence |
| 82 | | SC-7 | Melamine 1 Yes | Cobalt | | No occurrence | No occurrence |
| 83 | | SC-12 | Melamine 1 Yes | Cobalt | | No occurrence | No occurrence |
| 84 Comparative Example | | SC-18 | Melamine 2 Yes | No | | No occurrence | No occurrence |
| 17 | | NC-1 | Melamine 1 Yes | Cobalt | | Too much red rust. Impossible to evaluate. | 85 |
| 18 | | | No surface treatment | | | Too much red rust. Impossible to evaluate. | 90 |

As Evident from Table 9:

(1) the electrogalvanized steel sheets of Examples 1 through 56 which are treated with al surface treatment agents, which are the compositions containing the mercapto containing compounds, and the metal surface treatment methods of the present on exhibited significantly higher corrosion resistance compared to the galvanized steel sheets of Comparative Examples 1 to 3 which are treated with compositions containing no mercapto group-containing compounds and to the electrogalvanized steel sheets of Comparative Example 4 without any surface treatment. This is even more evident by comparing Example 55, using the metal surface treatment agent containing the mercapto group-containing compound, with Comparative Example 2 using the same metal surface treatment agent except for Its containing no mercapto group-containing compound.

(2) Comparing Examples 1 to 19 using the metal surface treatment agents containing no curing agent with Example 20 to 38 and Examples 45 to 56 using the metal surface treatment agents containing the curing agents, It is observed that those containing the curing agents clearly show Improvement of corrosion resistance.

(3) Comparing Examples 1 to 19 and Examples 20 to 44 using the metal surface treatment agents containing no silica with Examples 45 to 50 and Examples 54 to 56 using the metal surface treatment agents containing silica, It was observed that those containing silica clearly showed Improvement of corrosion resistance.

(4) Comparing Examples 1 to 50 using the metal surface treatment agents containing no curing catalysts with Examples 51 to 56 using the metal surface treatment agents containing the curing catalysts, It is observed that those containing the curing catalysts clearly show Improvement of corrosion resistance.

(5) Any of Examples 1 to 8 and 20 to 27 using the metal surface treatment agents having the mercapto group-containing low molecular weight polyester compound as the primary component and Examples 9 to 19 and 28 to 38 using the metal surface treatment agents having the mercapto group-containing high molecular weight polyester compounds, the mercapto group-containing resins, or the mercapto group and crosslinking group-containing compounds as the primary component provided good corrosion resistance.

(6) These were the same for any of the hot-dipped zinc plated steel sheets, hot-dipped zinc-aluminum alloy steel sheets, the aluminum alloy plates, iron plates, magnesium alloy plates, DACROTIZED® hexa bolts and blast zinc coated hexa bolts.

(7) The electrogalvanized steel sheets of Examples 1 to 56, treated with the metal surface treatment agents containing the mercapto group-containing compounds having 1 millimole/g or greater of the equivalent weight of the mercapto groups as the component (A), clearly showed good corrosion resistance results compared to the electrogalvanized steel sheets of Comparative Examples 1 to 3, treated with the metal surface treatment agents containing the mercapto group-containing compounds having less than 1 millimole/g of the equivalent weight of the mercapto groups as the component (A). The reason why 1 millimole/g or greater dramatically improves corrosion resistance is not yet understood, but it is believed that when the equivalent weight of the mercapto groups is less than 1 millimole/g, the mercapto groups in the molecules are lesser and self-condensation between the mercapto groups is more difficult to take place.

(8) Examples 13 to 15 and 32 to 34 have the same level of the equivalent weight of the mercapto groups, but different molecular weight of the mercapto groups-containing compounds (A). Nevertheless, desirable corrosion resistance is obtained in each case.

EXAMPLE 85 AND COMPARATIVE EXAMPLE 19

Evaluation of Spot-weldability

Spot-weldability was observed using 0.8 mm thick electrogalvanized steel sheets (zinc deposit: 20 g/m$^2$) which were treated with the same metal surface treatment agents and treatment conditions of selected, above-described Examples, which are noted in Table 10 below. Spot-welding conditions are as follows.

Weld time: 13 cycles

Welding force: 100 Kg

Current: 6500A

Evaluations were performed by measuring diameters of solidified portions at joints (usually called "nugget"). Further, in order to evaluate a degree of deterioration of electrodes, nugget diameters were measured in millimeters at 500 welding spots and 1,000 welding spots using the same electrode. As a comparison, the above described electrogalvanized steel sheet treated with chromate treatment was used.

As evident from the results shown in Table 10, when compared with chromate treatment of the prior art, the surfaces of metal sheets treated with the metal surface treatment agents of the present invention realize favorable spot-weldability.

TABLE 10

| Metal surface treatment agents | Nugget diameters (mm) | | |
|---|---|---|---|
| (reference examples) | Initial | 500 Spots | 1,000 Spots |
| Example 3 | 5.2 | 4.9 | 4.7 |
| Example 7 | 5.1 | 4.7 | 4.5 |
| Example 12 | 5.3 | 4.8 | 4.7 |
| Example 17 | 5.0 | 5.1 | 4.6 |
| Example 18 | 5.5 | 5.2 | 5.1 |
| Example 19 | 5.1 | 5.0 | 4.7 |
| Example 22 | 5.3 | 4.8 | 4.7 |
| Example 26 | 5.2 | 4.7 | 4.6 |
| Example 31 | 5.3 | 4.8 | 4.6 |
| Example 36 | 5.2 | 5.0 | 4.7 |
| Example 37 | 5.1 | 4.9 | 4.8 |
| Example 38 | 5.0 | 4.9 | 4.6 |
| Example 45 | 5.1 | 4.9 | 4.6 |
| Example 46 | 5.1 | 4.7 | 4.5 |
| Example 47 | 5.0 | 4.8 | 4.6 |
| Example 48 | 5.1 | 4.7 | 4.4 |
| Example 49 | 5.2 | 4.6 | 4.6 |
| Example 50 | 5.2 | 4.8 | 4.5 |
| Example 51 | 5.3 | 5.0 | 4.7 |
| Example 52 | 5.2 | 4.9 | 4.6 |
| Example 53 | 5.1 | 4.8 | 4.5 |
| Example 54 | 5.2 | 4.8 | 4.5 |
| Example 55 | 5.1 | 4.9 | 4.5 |
| Example 56 | 5.3 | 4.9 | 4.7 |
| Comparative Example | 5.2 | 4.9 | 4.6 |

EXAMPLE 86 AND COMPARATIVE EXAMPLE 20

Evaluation of Adhesion and Post-processing Corrosion Resistance

Coating adhesion and post-processing corrosion resistance were observed for 0.35 mm thick electrogalvanized steel sheets (zinc deposit: 20 g/m$^2$) which were treated with the same metal surface treatment agents and treatment conditions as described hereinbefore, for selected Examples as noted in Table 11 below. As a testing method of processability, the treated coating surface was placed, so as to be an outer bent surface, on 6 mm, 8 mm and 10 mm diameter bars and after bending 180 degrees, a pressure sensitive adhesive tape was applied to the coating and removed (tape adhesion) and corrosion resistance (salt spray test: 240 hours) were observed. As a comparison example, the above described electrogalvanized steel sheet treated with chromate treatment was used.

As evident from the results shown in Table 11, compared to chromate treatment of the prior art, the metal sheets treated with the metal surface treatment agents of the present invention can realize coating adhesion and post-processing corrosion resistance which are favorable in comparison.

TABLE 11

| | 10 mm | | 8 mm | | 6 mm | |
|---|---|---|---|---|---|---|
| Metal Surface treatment agents (reference examples) | Adhesion | Corrosion Resistance | Adhesion | Corrosion Resistance | Adhesion | Corrosion Resistance |
| Example 3 | 10 | 0 | 10 | 0 | 8 | Δ |
| Example 7 | 10 | 0 | 10 | 0 | 8 | Δ |
| Example 12 | 10 | 0 | 10 | 0 | 8 | Δ |
| Example 17 | 10 | 0 | 10 | 0 | 8 | Δ |
| Example 18 | 10 | 0 | 10 | 0 | 8 | Δ |
| Example 19 | 10 | 0 | 10 | 0 | 8 | Δ |
| Example 22 | 10 | 0 | 10 | 0 | 10 | 0 |
| Example 26 | 10 | 0 | 10 | 0 | 10 | 0 |
| Example 31 | 10 | 0 | 10 | 0 | 10 | 0 |
| Example 36 | 10 | 0 | 10 | 0 | 10 | 0 |
| Example 37 | 10 | 0 | 10 | 0 | 10 | 0 |
| Example 38 | 10 | 0 | 10 | 0 | 10 | 0 |
| Example 45 | 10 | 0 | 10 | 0 | 10 | 0 |
| Example 46 | 10 | 0 | 10 | 0 | 10 | 0 |
| Example 47 | 10 | 0 | 10 | 0 | 10 | 0 |
| Example 48 | 10 | 0 | 10 | 0 | 10 | 0 |
| Example 49 | 10 | 0 | 10 | 0 | 10 | 0 |
| Example 50 | 10 | 0 | 10 | 0 | 10 | 0 |
| Example 51 | 10 | 0 | 10 | 0 | 10 | 0 |
| Example 52 | 10 | 0 | 10 | 0 | 10 | 0 |
| Example 53 | 10 | 0 | 10 | 0 | 10 | 0 |
| Example 54 | 10 | 0 | 10 | 0 | 10 | 0 |
| Example 55 | 10 | 0 | 10 | 0 | 10 | 0 |
| Example 56 | 10 | 0 | 10 | 0 | 10 | 0 |
| Comparative Example | 10 | 0 | 10 | 0 | 8 | Δ |

Evaluation:
Adhesion: 10 is No separation; 8 is slight coating separation; 1 is entire separation
Corrosion resistance
0: No occurrence of red rust
Δ: Slight occurrence of red rust (less than 5% of the area of the bent portion)
X: Significant occurrence of red rust (over 5% of the area of the bent portion)

What is claimed is:

1. A metal surface treatment agent for forming an anti-corrosion coating on the surface of a metal, which agent consists essentially of:

(A) a primary component of at least one kind of mercapto group-containing compounds selected from the following groups:

(1) a mercapto group-containing compound (a) which is obtained by condensation from the esterification reaction of polyhydric alcohol having at least two hydroxyl groups per molecule and a mercapto group-containing acid compound having at least one mercapto group per molecule and at least one carboxyl group per molecule and also which has an equivalent weight of the mercapto groups in the range of 1 through 18 millimoles/g;

(2) a mercapto group-containing compound (b) which is obtained by condensation from the esterification reaction of polyhydric alcohol having at least two hydroxyl groups per molecule, a mercapto group-containing acid compound having at least one mercapto group and at least one carboxyl group per molecule, and a polyacid compound having at least two carboxyl groups per molecule, and also which has an equivalent weight of the mercapto groups in the range of 1 through 18 millimoles/g;

(3) a mercapto group-containing compound (c) which is obtained by condensation from the esterification reaction of a hydroxyl group-containing resin having a hydroxyl value of at least about 30 mg-KOH/g and a mercapto group-containing acid compound having at least one mercapto group per molecule and at least one carboxyl group per molecule, and also which has an equivalent weight of the mercapto groups in the range of 1 through 18 millimoles/g; and (4) a mercapto group-containing compound (d) which both contains at least one mercapto group per molecule and at least two cross-linking functional groups, and also which has an equivalent weight of the mercapto groups in the range of 1 through 18 millimoles/g; and (B) a curing agent component wherein said agent is at least one type of compound selected from the group consisting of aminoplast compounds, polyisocyanate compounds and epoxy compounds.

2. The metal surface treatment agent of claim 1, which further contains one or more of a curing catalyst and silica.

3. The metal surface treatment agent of claim 2 wherein said curing catalyst is a cobalt-containing curing catalyst.

4. The metal surface treatment agent of claim 2 wherein said silica is a fumed silica.

5. The metal surface treatment agent of claim 2 wherein said silica has a particle size within the range of from 0.5 to 300 nanometers and is present in an amount within the range of from 0.05 to 10 weight percent, basis solid content of said agent.

6. A method of treating metal surfaces characterized by including a coating forming process, which method comprises:

(1) compounding together the components described in any of the claims 1 through 4;

(2) coating a metal surface with the metal surface treatment agent components described in any of the claims 1 through 4 that have been compounded together;

(3) setting the coating; and (4) providing a heat treatment process in which the coating of the metal surface treatment agent is heated.

7. The method of claim 6 wherein said heat treatment process is conducted at a temperature within the range of from 100 to 400° C.

8. The metal surface treatment agent of claim 1 wherein said mercapto group-containing compound (a) is the esterification product of a polyhydric alcohol with one or more of a mercapto group-containing acid compound and mercapto group-containing acid compound derivative.

9. The metal surface treatment agent of claim 8 wherein said mercapto group-containing acid compound is represented by the formula (1):

$$HOOC—R—SH \qquad (1)$$

wherein R represents one or more of a linear alkyl group, a branched alkyl group and a cyclic alkyl group, with each group having from 1 to 20 carbon atoms.

10. The metal surface treatment agent of claim 8 wherein said mercapto group-containing acid compound is a mercapto alkyl carboxylic acid compound having an alkyl group containing from 1 to 10 carbon atoms.

11. The metal surface treatment agent of claim 1 wherein said curing agent component (B) aminoplast compounds are condensates of an amino compound, said component (B) polyisocyanate compounds are selected from the group consisting of aliphatic diisocyanates, alicyclic diisocyanates, aeromatic diisocyanates, organic diisocyanate polymers of the foregoing, organic diisocyanate addition products of the foregoing and biuret compounds of the foregoing.

12. The metal surface treatment agent of claim 1 wherein said curing agent component (B) epoxy compounds are selected from the group consisting of bisphenol A epoxy resins, brominated bisphenol A epoxy resins, novolak type epoxy resins, phenol novolak type epoxy resins, alicyclic epoxy resins, polyglycidylamine type phenol resins, alcohol type epoxy resins, ester type epoxy resins and aliphatic epoxy resins.

13. The metal surface treatment agent of claim 1 wherein said curing agent component (B) is present in an amount within the range of from 1 to 300 weight parts for each 100 weight parts of said primary component (A).

14. A coated metal article characterized by having a cured coating of the surface treatment agent of claim 1, which article comprises:

(A) a metal substrate selected from the group consisting of iron, steel including stainless steel and cold rolled steel, zinc, aluminum, copper, magnesium and alloys of the foregoing;

(B) a coating on said substrate metal which coating is selected from the group consisting of electroplated coating, hot-dipped coating, alloy plating, plated coating without electrolysis, blast zinc coating, coating of zinc powder and chromium; and (C) a coating on said coating (B) consisting essentially of said surface treatment agent of claim 1, which coating has a coating thickness within the range of from 0.01 to 50 microns.

15. The article of claim 14 wherein said article is free from hexavalent chromium compounds.

16. A metal surface treatment agent characterized by containing:

(A) a primary component of mercapto group-containing compounds which are:

(1) mercapto group-containing compounds obtained by condensation from the esterification reaction of polyhydric alcohol having at least two hydroxyl groups per molecule and a mercapto group-containing acid compound having at least one mercapto group per molecule and at least one carboxyl group per molecule and also which have an equivalent weight of the mercapto groups in the range of 1 through 18 millimoles/g; and (B) a curing agent component wherein said agent is at least one type of compound selected from the group consisting of aminoplast compounds, polyisocyanate compounds and epoxy compounds; and wherein said mercapto group-containing compounds are the esterification product of a polyhydric alcohol with one or more of a mercapto group-containing acid compound and mercapto group-containing acid compound derivative and the mercapto group-containing acid compound derivative is selected from the group consisting of acid halides and acid anhydrides and the acid halides are represented by the formula (1):

$$XOC-R-SH \tag{1}$$

wherein X represents a halogen atom, and the acid anhydrides are represented by the formula (2):

$$O=(OC-R-SH)_2 \tag{2}$$

wherein R in the formulas 1 and 2 is selected from the groups consisting of linear alkyl groups, branched alkyl groups, and cyclic alkyl groups, with each group having from 1 to 20 carbon atoms.

* * * * *